United States Patent
Sudo et al.

(10) Patent No.: US 11,425,197 B2
(45) Date of Patent: Aug. 23, 2022

(54) CONDITION MONITORING DEVICE AND METHOD

(71) Applicant: KABUSHIKI KAISHA TOSHIBA, Tokyo (JP)

(72) Inventors: Takashi Sudo, Fuchu (JP); Yasuhiro Kanishima, Suginami (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/018,189

(22) Filed: Sep. 11, 2020

(65) Prior Publication Data
US 2021/0272704 A1    Sep. 2, 2021

(30) Foreign Application Priority Data
Feb. 27, 2020  (JP) .............................. JP2020-031869

(51) Int. Cl.
*H04L 67/12*   (2022.01)
*G06N 3/04*   (2006.01)
(Continued)

(52) U.S. Cl.
CPC ............ *H04L 67/12* (2013.01); *G06K 9/6215* (2013.01); *G06N 3/0454* (2013.01); *G16Y 40/10* (2020.01); *G16Y 40/35* (2020.01); *G06N 3/08* (2013.01)

(58) Field of Classification Search
CPC ...... G06K 9/6215; G06N 3/0454; G06N 3/08; G16Y 40/10; G16Y 40/35; H04L 67/12
See application file for complete search history.

(56) References Cited

U.S. PATENT DOCUMENTS

2019/0324433 A1\* 10/2019 Cella ................. G05B 19/41845
2020/0143605 A1   5/2020 Kanishima et al.
(Continued)

FOREIGN PATENT DOCUMENTS

JP    2019-49778 A    3/2019
JP    2020-77186 A    5/2020
(Continued)

OTHER PUBLICATIONS

@Shinmura0, "What is the difference between "weak anomaly detection" and other anomaly detection?" (with English translation) downloaded from: https://gilta.com/shinmura0/items/1af83f5a5857d50cabc2, Dec. 10, 2019 35 pages.

*Primary Examiner* — Jason D Recek
(74) *Attorney, Agent, or Firm* — Oblon, McClelland, Maier & Neustadt, L.L.P.

(57) ABSTRACT

According to one embodiment, a condition monitoring device includes a storage device and a processor. The storage device is configured to store in advance a template related to a second operation segment signal. The processor is configured to acquire a time-series signal from a first sensor, acquire operation timing information, detect a first operation segment signal from the time-series signal based on the operation timing information, detect a second operation segment signal in a segment identified based on a degree of similarity to the template of the first operation segment signal, and determine a condition of the monitored target based on the second operation segment signal. The template is updated based on the detected second operation segment signal.

9 Claims, 13 Drawing Sheets

(51) Int. Cl.
*G16Y 40/35* (2020.01)
*G06K 9/62* (2022.01)
*G16Y 40/10* (2020.01)
*G06N 3/08* (2006.01)

(56) References Cited

U.S. PATENT DOCUMENTS

2020/0293527 A1* 9/2020 Srivastav ............ G06F 16/2477
2021/0010909 A1  1/2021 Yanagihashi et al.
2021/0065918 A1  3/2021 Kanishima et al.

FOREIGN PATENT DOCUMENTS

JP  2021-15405 A  2/2021
JP  2021-33842 A  3/2021

* cited by examiner

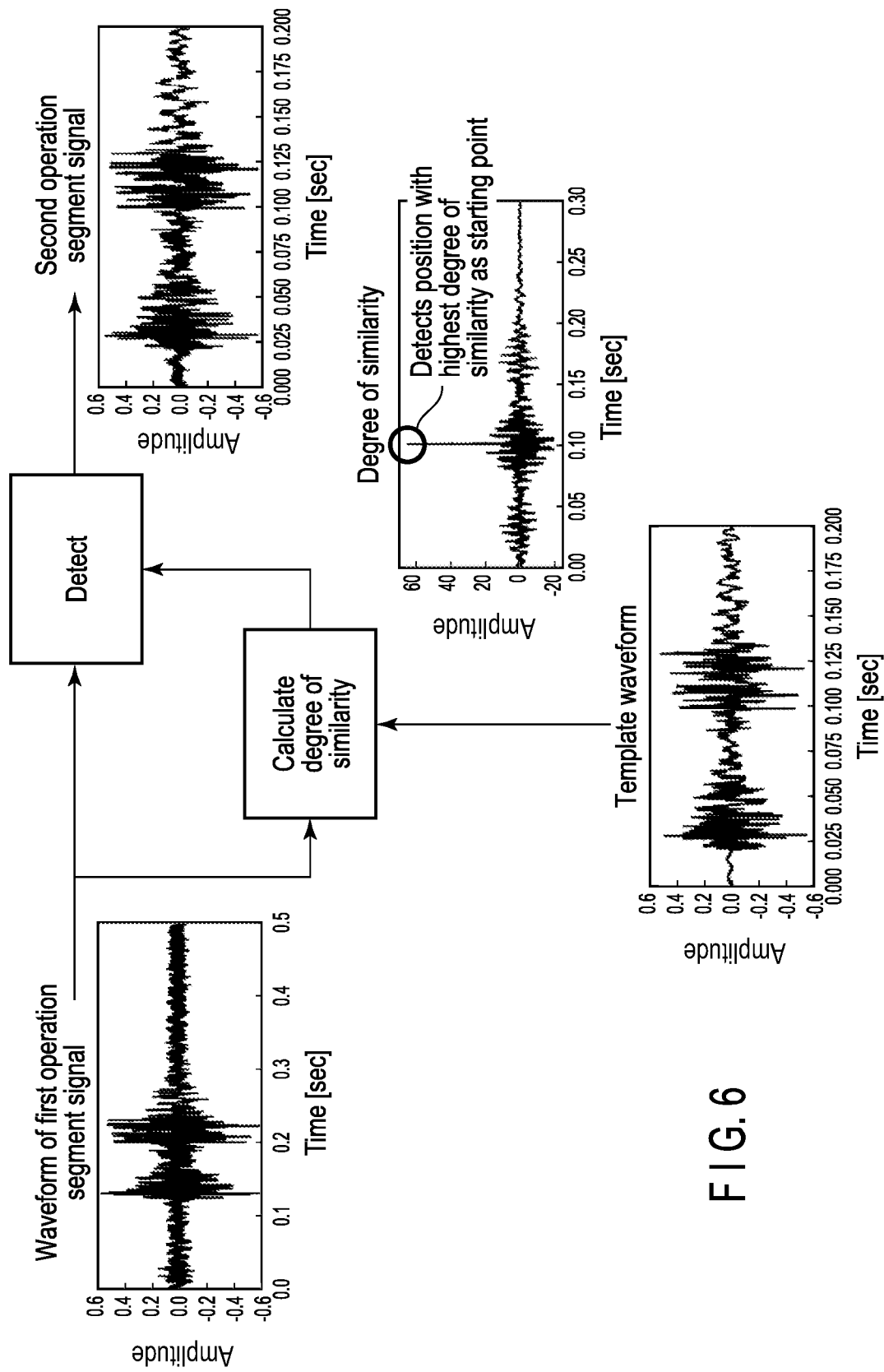
F I G. 6

CONDITION MONITORING DEVICE AND METHOD

CROSS-REFERENCE TO RELATED APPLICATIONS

This application is based upon and claims the benefit of priority from Japanese Patent Application No. 2020-031869, filed Feb. 27, 2020, the entire contents of which are incorporated herein by reference.

FIELD

Embodiments described herein relate generally to a condition monitoring device and a method.

BACKGROUND

With the recent progress of an Internet of Things (IoT), a condition monitoring device has been developed that monitors the condition of a monitored target based on signals (data) acquired using various sensors.

In such a condition monitoring device, it is necessary to determine the condition of the monitored target in real time, and improvement of the real-time property and improvement of accuracy in determining the condition are required.

BRIEF DESCRIPTION OF THE DRAWINGS

FIG. 6 is a diagram conceptually showing a second operation segment signal detection process.

DETAILED DESCRIPTION

In general, according to one embodiment, a condition monitoring device includes a storage device and a processor connected to the storage device. The storage device is configured to store in advance a template related to a time-series signal to be detected as a second operation segment signal. The processor is configured to acquire a time-series signal related to a condition of a monitored target from a first sensor, acquire operation timing information indicating a start of an operation of the monitored target, detect a first operation segment signal from the time-series signal based on the operation timing information, detect, as a second operation segment signal, a time-series signal in a segment identified based on a degree of similarity to the template of the first operation segment signal, and determine a condition of the monitored target based on the second operation segment signal. The template is updated based on the detected second operation segment signal.

Various embodiments will be described hereinafter with reference to the accompanying drawings.

First Embodiment

Figure 1:
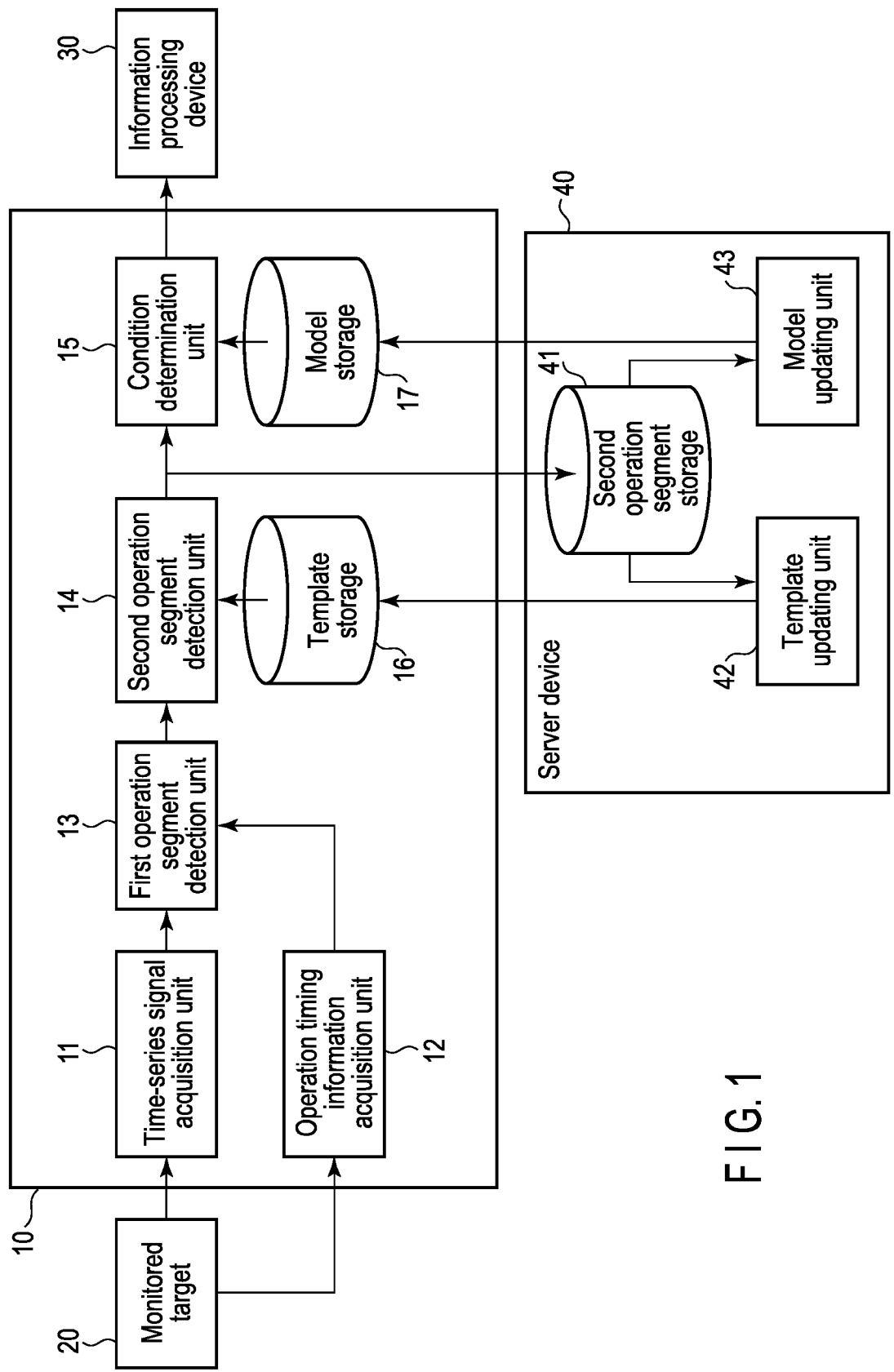
FIG. 1 is a block diagram showing an example of a functional configuration of a condition monitoring device according to a first embodiment.

The first embodiment will be described. FIG. 1 is a block diagram showing an example of the functional configuration of the condition monitoring device according to the embodiment. As shown in FIG. 1, a condition monitoring device 10 is communicably connected to a monitored target 20 and an information processing device 30. The condition monitoring device 10 does not need to be directly connected to the monitored target 20, for example, and may be configured to be able to acquire a signal from a sensor attached to the monitored target 20 described later.

Here, the monitored target 20 includes a device provided in, for example, a manufacturing factory, a plant, a construction site, an educational institution, a medical institution, a housing facility or the like. In the embodiment, the monitored target 20 will be mainly described as an apparatus (press machine) that presses a product with a mold in a production line of a manufacturing factory, for example.

The condition monitoring device 10 determines the condition of the monitored target 20 based on a signal acquired by a sensor attached to the monitored target 20, for example. The determination result by the condition monitoring device 10 is output to the information processing device 30.

The information processing device 30 is, for example, an electronic device including a display capable of outputting the determination result by the condition monitoring device 10 as an image, a speaker capable of outputting the determination result as sound, and the like, and may execute a predetermined process based on the determination result by the condition monitoring device 10. That is, the information processing device 30 may be, for example, a server device or the like capable of outputting (making a notification of) the determination result by the condition monitoring device 10 to a provider of various services, may be a control device or the like capable of outputting a control command to the above production line or the like, or may be a controller server or the like capable of outputting a control command to a network device such as a router.

In addition, in the embodiment, the condition monitoring device 10 is realized as an edge device (terminal) for the IoT, which has smaller calculation resources than the above information processing device 30 or other server devices.

The condition monitoring device 10 shown in FIG. 1 includes a time-series signal acquisition unit 11, an operation timing information acquisition unit 12, a first operation segment detection unit 13, a second operation segment detection unit 14, a condition determination unit 15, and a template storage 16 and a model storage 17.

The time-series signal acquisition unit 11 is a functional unit that acquires a signal related to the condition of the monitored target 20 (a signal resulting from the operation of the monitored target 20). The sensor attached to the monitored target 20 is continuously driven, and the time-series signal acquisition unit 11 acquires the time-series signal from the sensor.

The operation timing information acquisition unit 12 acquires operation timing information indicating the start of the operation of the monitored target 20.

The first operation segment detection unit 13 detects the first operation segment signal from the time-series signal acquired by the time-series signal acquisition unit 11 based on the operation timing information acquired by the operation timing information acquisition unit 12.

The second operation segment detection unit 14 detects the second operation segment signal from the first operation segment signal based on the waveform characteristic of the first operation segment signal detected by the first operation segment detection unit 13.

The condition determination unit 15 determines the condition of the monitored target 20 based on the second operation segment signal detected by the second operation segment detection unit 14. Note that the determination result by the condition determination unit 15 includes, for example, that the monitored target 20 is in a normal condition (hereinafter, simply referred to as "normal") and the monitored target 20 is in an anomalous condition (hereinafter, simply referred to as "anomalous"). The determination result by the condition determination unit 15 is output to the above-described information processing device 30.

The template storage 16 stores the template in which a waveform corresponding to a time-series signal to be detected as the second operation segment signal (hereinafter referred to as a template waveform) and a time length of the time-series signal to be detected as the second operation segment signal (hereinafter referred to as a template time length) are defined. The details of the template stored in the template storage 16 will be described later.

The model storage 17 stores in advance a trained model (statistical model) used in the determination process by the condition determination unit 15 described above. The details of the trained model stored in the model storage 17 will be described later.

Here, as shown in FIG. 1, a server device 40 is further communicably connected to the condition monitoring device 10. The server device 40 includes a second operation segment storage 41, a template updating unit 42, and a model updating unit 43.

The second operation segment storage 41 stores (accumulates) the second operation segment signal (waveform) detected by the second operation segment detection unit 14 included in the condition monitoring device 10.

The template updating unit 42 is a functional unit that updates the template stored in the template storage 16 described above based on the second operation segment signal stored in the second operation segment storage 41. Details of the template updating process by the template updating unit 42 will be described later.

The model updating unit 43 is a functional unit that updates the trained model stored in the model storage 17 described above based on the second operation segment signal stored in the second operation segment storage 41. Details of the process of updating the trained model by the model updating unit 43 will be described later.

In the embodiment, although the description is made assuming that the condition monitoring device 10 is realized as an edge device, when the condition monitoring device 10 has sufficient calculation resources, the second operation segment storage 41, the template updating unit 42, and the model updating unit 43 included in the server device 40 described above may be incorporated in the condition monitoring device 10.

Figure 2:
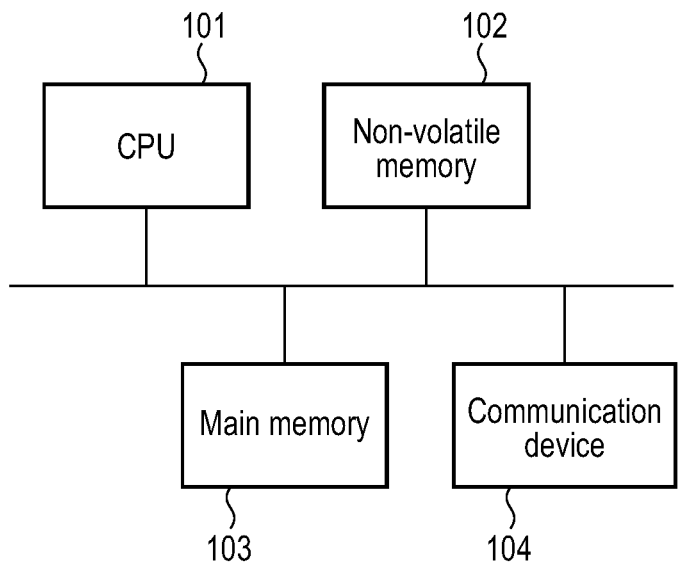
FIG. 2 is a diagram showing an example of a hardware configuration of the condition monitoring device.

FIG. 2 shows an example of the hardware configuration of the condition monitoring device 10 shown in FIG. 1. The condition monitoring device 10 includes a CPU 101, a non-volatile memory 102, a main memory 103, a communication device 104, and the like. The CPU 101, the non-volatile memory 102, the main memory 103, and the communication device 104 are connected to each other via, for example, a bus.

The CPU 101 is a processor that controls the operation of various components in the condition monitoring device 10. The CPU 101 may be a single processor or a plurality of processors. The CPU 101 executes various program loaded from the non-volatile memory 102 into the main memory 103. These programs include, for example, an operating system (OS) and the like.

The non-volatile memory 102 is a storage medium (storage device) used as an auxiliary storage device. The main memory 103 is a storage medium (storage device) used as a main storage device. In FIG. 2 only the non-volatile memory 102 and the main memory 103 are shown, but the condition monitoring device 10 may include other storage devices such as a hard disk drive (HDD) and a solid state drive (SSD).

In the embodiment, part or all of the time-series signal acquisition unit 11, the operation timing information acquisition unit 12, the first operation segment detection unit 13, the second operation segment detection unit 14, and the condition determination unit 15 included in the condition monitoring device 10 shown in FIG. 1 are realized by causing the CPU 101 (that is, the computer of the condition monitoring device 10) to execute a predetermined program (hereinafter, referred to as a condition monitoring program), that is, by software. This condition monitoring program may be stored in a computer-readable storage medium and distributed, or may be downloaded to the condition monitoring device 10 via a network. Note that part or all of these units 11 to 15 may be realized by hardware such as an integrated circuit (IC), or may be realized by a combination of software and hardware.

The template storage 16 and the model storage 17 included in the condition monitoring device 10 shown in FIG. 1 are realized by the non-volatile memory 102 or another storage device.

The communication device 104 is a device configured to perform wired communication or wireless communication with external devices such as the above monitored target 20 (the sensor attached thereto), the information processing device 30, and the server device 40.

Although the hardware configuration of the condition monitoring device 10 is described here, it is assumed that the server device 40 communicatively connected to the condition monitoring device 10 also has a hardware configuration similar to that of the condition monitoring device 10. That is, the second operation segment storage 41 included in the server device 40 may be realized by a non-volatile memory or another storage device included in the server device 40. Further, part or all of the template updating unit 42 and the model updating unit 43 included in the server device 40 may be realized by causing a CPU (that is, a computer of the server device 40) included in the server device 40 to execute a predetermined program, may be realized by hardware, or may be realized by a combination of software and hardware.

Next, an example of a processing procedure when the condition monitoring device 10 according to the embodiment monitors the condition of the monitored target 20 will be described with reference to the flowchart in FIG. 3.

Here, in the embodiment, for example, the first and second sensors are attached to the monitored target 20.

The first sensor is a sensor that measures a signal related to the condition of the monitored target 20. The second sensor is a sensor that measures a signal corresponding to operation timing information indicating the start of the operation of the monitored target 20. The signals measured by the first and second sensors include any physical quantity that can be measured (measured) by the first and second sensors.

Specifically, as described above, when the monitored target 20 is a press machine that presses the product with a mold in the production line, for example, a microphone that measures the sound generated during the press working can be used as the first sensor. Further, for example, a distance measuring sensor that measures the distance from the sensor to the mold by using light or ultrasonic waves can be used as the second sensor.

It is assumed that the first and second sensors described above are continuously driven when the condition monitoring device 10 monitors the condition of the monitored target 20.

When the condition monitoring device 10 monitors the monitored target 20, the time-series signal acquisition unit 11 starts acquisition of the time-series signal measured by the continuously driven first sensor (step S1). The time-series signal acquisition unit 11 continuously acquires the time-series signal even while the process of step S2 and subsequent steps described below are executed. When the first sensor is the microphone as described above, the time-series signal acquired by the time-series signal acquisition unit 11 is a signal including the waveform of the sound continuously measured by the microphone.

Next, the operation timing information acquisition unit 12 acquires the signal measured by the continuously driven second sensor. Here, as described above, when the monitored target 20 is a press machine, and the second sensor is a distance measuring sensor that measures the distance from the second sensor to the mold used for press working in the press machine, the operation timing information acquisition unit 12 can detect that, for example, the mold is away from the second sensor (that is, the press machine operates, and the mold is pressed into the product) based on the signal measured by the second sensor. In this case, the operation timing information acquisition unit 12 acquires the operation timing information indicating the start of the operation of the monitored target 20 (press machine). The operation timing information is acquired, for example, when the distance from the second sensor to the mold is equal to or greater than a predetermined value.

As a result, the operation timing information acquisition unit 12 determines whether it is time for the monitored target 20 to start the operation (that is, the operation timing information has been acquired) by monitoring the signal measured by the second sensor (step S2).

When it is determined that it is not time for the monitored target 20 to start the operation (NO in step S2), the process of step S2 is repeated.

On the other hand, when it is determined that it is time for the monitored target 20 to start the motion (YES in step S2), the first operation segment detection unit 13 holds the time-series signal acquired by the time-series signal acquisition unit 11 inside the first operation segment detection unit 13 (step S3).

Next, the first operation segment detection unit 13 determines whether a given time (predetermined time) has elapsed after it is determined in step S2 that it is time for the monitored target 20 to start the operation.

When it is determined that the given time has not elapsed (NO in step S4), the process returns to step S3 and the process is repeated.

On the other hand, when it is determined that the given time has elapsed (YES in step S4), the first operation segment detection unit 13 detects, as the first operation segment signal, the time-series signal held inside the first operation segment detection unit 13 in step S3 (step S5).

That is, in the embodiment, of the time-series signal continuously acquired by the time-series signal acquisition unit 11, the time-series signal in the segment until the given time elapses after the operation timing information is acquired is detected (acquired) as the first operation segment signal. Note that the given time corresponds to, for example, a time obtained by adding a certain time as a margin to the operation time of the monitored target 20 which is measured in advance.

Here, since the above-mentioned first and second sensors are driven independently of each other, the operation timing information is asynchronous with respect to the time-series signal. Therefore, the first operation segment signal may be a time-series signal until a given time elapses from timing slightly before the timing at which the operation timing information is acquired by providing a buffer. Further, the first operation segment signal may be a time-series signal until a given time elapses from timing slightly after the timing at which the operation timing information is acquired by providing a delay.

When the process of step S5 is executed, the second operation segment detection unit 14 executes, based on the characteristic of the waveform of the first operation segment signal detected in step S5, a process of detecting the second operation segment signal from the first operation segment signal (hereinafter referred to as a second operation segment signal detection process) (step S6).

Here, the time resolution of sampling of the operation timing information (second sensor) is generally lower than the time resolution of sampling of the time-series signal (first sensor). For this reason, in step S5 described above, the first operation segment signal (coarse operation segment signal) is detected with a relatively coarse sampling time resolution based on operation timing information, and in step S6, the second operation segment signal (fine operation segment signal) is detected with a finer time resolution of sampling than the first operation segment signal.

Note that the template stored in the template storage 16 is used in the second operation segment signal detection process in step S6, and details of the second operation segment signal detection process will be described later.

Next, the condition determination unit 15 determines the condition of the monitored target 20 based on the second operation segment signal detected in step S6 and the trained model stored in the model storage 17 (step S7).

Hereinafter, the process of step S7 will be described in detail. First, the trained model (hereinafter referred to as a first model) stored in the model storage 17 in the embodiment is, for example, a mathematical model or a physical model, and more specifically, a neural network.

In the embodiment, the first model is generated, for example, by learning using the second operation segment signal when the monitored target 20 is in a normal condition (the monitored target 20 is in a good condition). In addition, "when the monitored target 20 is in a normal condition" means, for example, when the monitored target 20 starts to operate (when the monitored target 20 is delivered and first operates) or when the maintenance of the monitored target 20 is performed.

Further, the second operation segment signal that the first model learns may be obtained by the condition monitoring device 10 (second operation segment detection unit 14) described above, or may be prepared outside the condition monitoring device 10. Since the learning process of the first model has a large amount of processing, the first model may be generated not by the condition monitoring device 10 (edge device) but by an external server device (for example, the server device 40) or the like.

Here, the first model in the embodiment is made to learn so that the input layer and the output layer are the same, and functions as an autoencoder (AE), for example. According to the first model, for example, with respect to the input signal (input data) input to the first model, an output signal (output data) that reconstructs the input signal is output.

That is, when using the first model, when the condition of the monitored target 20 is "normal", the first model outputs an output signal that is the same as or similar to the input signal (second operation segment signal). On the other hand, when the condition of the monitored target 20 is "anomalous", the first model outputs an output signal that is not similar to the input signal (second operation segment signal).

Therefore, the condition determination unit 15 inputs the second operation segment signal (time-series signal) detected in step S6 to the first model as an input signal, and obtains the output signal output from the first model. Specifically, for example, when $Xt1, Xt2, \ldots, Xtn$ are input to the first model as the second operation segment signals (input signals), $Yt1, Yt2, \ldots, Ytn$ are output from the first model as output signals. Note that $Xti$ ($i=1, 2, \ldots, n$) is a signal value at time $ti$ included in the second operation segment signal. On the other hand, $Yti$ ($i=1, 2, \ldots, n$) is a signal value (output signal) output when $Xti$ is input to the first model. In this case, n is an integer of 1 or more.

Next, the condition determination unit 15 calculates the anomaly score of the monitored target 20 based on the error (reconstruction error) between the input signal to the first model and the output signal from the first model. As the anomaly score, for example, the mean square error (MSE) between the input signals and the output signals can be used. The anomaly score calculated in this manner has a large value as the current condition of the monitored target 20 changes (worsens) as compared to that when the first model is generated (that is, when the second operation segment signal learned by the first model is detected).

The condition determination unit 15 determines that the condition of the monitored target 20 is "normal" when the above-mentioned anomaly score is less than a predetermined value (anomaly threshold). On the other hand, the condition determination unit 15 determines that the condition of the monitored target 20 is "anomalous" when the anomaly score is equal to or greater than the predetermined value (anomaly threshold).

In the embodiment, the condition of the monitored target 20 can be determined using the first model that functions as an autoencoder as described above.

Although the description has been made assuming that a trained model that functions as an autoencoder is used, for example, a configuration may be provided in which a trained model that functions as a variational autoencoder (VAE) is used. In this case, the anomaly score can be calculated based on the reconstruction probability or the reconstruction error of the latent variable in the variational autoencoder.

Furthermore, for example, a regression neural network having a long short-term memory (LSTM) structure may be used as a trained model (hereinafter referred to as a second model). In this case, the second model (LSTM) is constructed as a prediction model.

As in the above-described first model, the second model is generated by learning using the second operation segment signal when the monitored target 20 is in the normal condition. In addition, the second model is made to learn so that a predicted signal value is output as an output signal from the second model when, for example, the second operation segment signal (input signal) is input to the second model.

That is, when, for example, $Xti$ ($Xt1, Xt2, \ldots, Xtn$) is input as an input signal to the second model (prediction model) described above, when the condition of the monitored target 20 is "normal", a predicted signal value that is the same as or similar to $Xti+1$ (that is, a signal value next to $Xti$) is output from the second model as an output signal (that is, the output signal is similar to the prediction value). On the other hand, when the condition of the monitored target 20 is "anomalous", the predicted signal value that is not similar to $Xti+1$ is output from the second model as an output signal (that is, the output signal is not similar to the prediction value).

When $Xti$ is input to the second model as described above, the condition determination unit 15 calculates the error (prediction error) between the above-mentioned $Xti+1$ and the predicted signal value output from the second model as the anomaly score, and can determine the condition of the monitored target 20 based on the anomaly score. The mean square error (MSE) described above can be used as the anomaly score. The anomaly score calculated in this manner has a large value as the current condition of the monitored target 20 changes (worsens) as compared to that when the second model is generated (that is, when the second operation segment signal learned by the second model is detected).

Here, the description has been made assuming that the second operation segment signal detected in step S6 is input to the trained model, but the input signal of the trained model may be a signal obtained by performing a preprocess on the second operation segment signal. Specifically, the signal obtained by executing the standardization process in which the average is set to 0 and the variance is set to 1 with respect to the second operation segment signal detected in step S6 may be used as the input signal to the trained model. Instead of the standardization process, a process of removing a value outside a predetermined range or a process of converting the frequency may be executed.

The determination result in step S7 described above is output from the condition monitoring device 10 (condition determination unit 15) to, for example, the external information processing device 30. The determination result output from the condition monitoring device 10 to the information processing device 30 may be only the condition of the monitored target ("normal" or "anomalous"), or may include the above-mentioned anomaly score (continuous value indicating the anomaly score) and the like.

Figure 4:
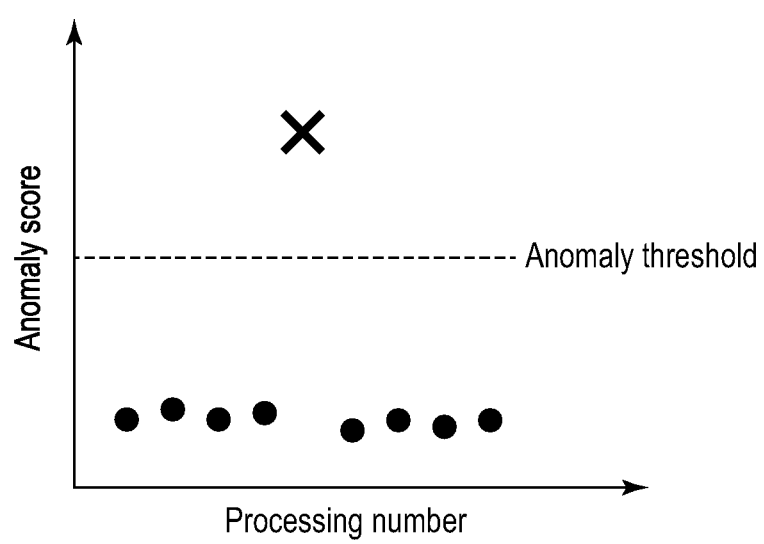
FIG. 4 is a diagram showing an example of a determination result displayed on a display.

The determination result output from the condition monitoring device 10 to the external information processing device 30 can be displayed on the information processing device 30 (for example, a display or the like), for example. FIG. 4 is an example of the determination result displayed on the information processing device 30. In FIG. 4, the monitored target 20 is, for example, a press machine, and an example in which the determination result of the condition of the monitored target 20 is displayed each time the press machine operates (presses the product with a mold) is shown. Specifically, in FIG. 4, the processing number assigned to the product and the anomaly score calculated when the product is pressed with a mold are displayed in association with each other. By checking the determination result as shown in FIG. 4, the administrator can easily understand that the monitored target 20 is performing an operation that is determined to be "anomalous" when pressing a product with a given processing number with a mold.

Next, an example of the processing procedure of the above-described second operation segment signal detection process (process of step S6 shown in FIG. 3) will be described with reference to the flowchart of FIG. 5.

First, the second operation segment detection unit 14 acquires the template stored in the template storage 16 (step S11). As described above, the template acquired in step S11 defines the template waveform (waveform corresponding to the time-series signal to be detected as the second operation segment signal) and the template time length (time length of the time-series signal to be detected as the second operation segment signal). The template stored in the template storage 16 is assumed to be generated (prepared) in advance based on the time-series signal acquired from the monitored target 20, for example, when the motion of the monitored target 20 is started.

Figure 3:
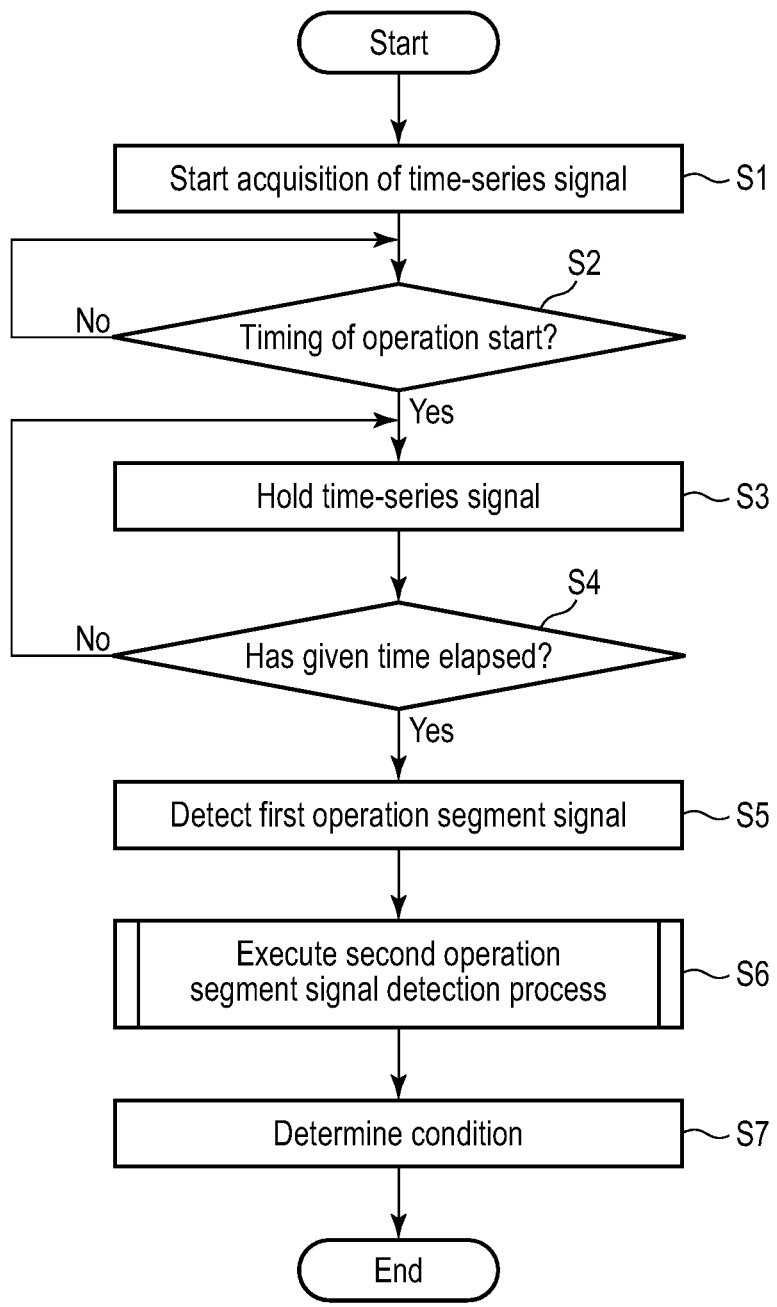
FIG. 3 is a flowchart showing an example of a processing procedure when the condition monitoring device monitors the condition of the monitored target.

Next, the second operation segment detection unit 14 cuts out, based on the template acquired in step S11, a time-series signal in a segment having the template time length from a given starting point position of the first operation segment signal detected in step S5 shown in FIG. 3 (step S12). The starting point position of the first operation segment signal is, for example, the beginning of the first operation segment signal (time-series signal).

When the process of step S12 is executed, the second operation segment detection unit 14 calculates the degree of similarity between (the characteristic point of the waveform of) the time-series signal cut out in step S12 and (the characteristic point of) the template waveform (step S13). In step S13, for example, a cross-correlation coefficient is calculated as the degree of similarity. Further, with respect to the time-series signal cut out in step S12 and the template waveform, the degree of similarity may be calculated after performing a finite impulse response (FIR) filtering process for extracting a characteristic frequency band in the monitored target 20.

Figure 5:
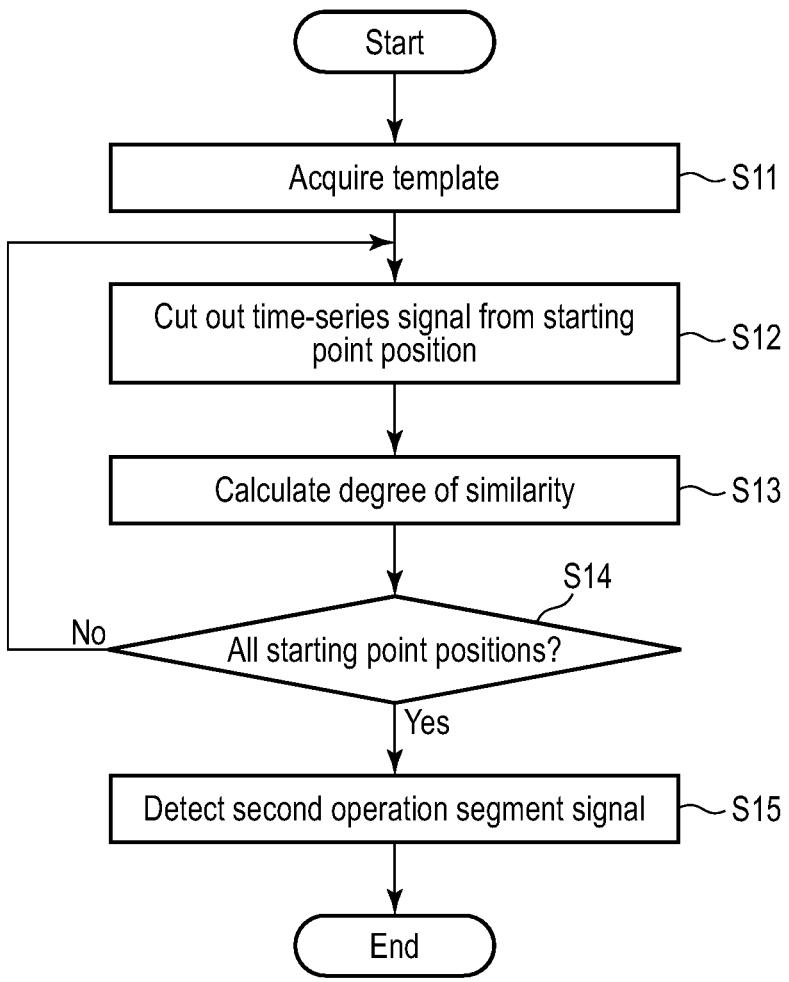
FIG. 5 is a flowchart showing an example of a processing procedure of a second operation segment signal detection process.

In the process shown in FIG. 5, the above-described starting point position is sequentially changed for each predetermined unit time (with accuracy of sampling cycle unit), and the process of steps S12 and S13 described above is repeated.

Next, it is determined whether the process of steps S12 and S13 has been executed for all the starting point positions (step S14).

When it is determined that the process has not been executed for all the starting point positions (NO in step S14), the process returns to step S12 and the process is repeated.

On the other hand, when it is determined that the process has been executed for all the starting point positions (YES in step S14), the second operation segment detection unit 14 detects the time-series signal having the highest degree of similarity to the template waveform calculated in step S13 described above as the second operation segment signal (step S15). In other words, in step S15, a time-series signal until a given time (template time length) elapses from the starting point position when the highest degree of similarity is calculated is detected as the second operation segment signal.

That is, according to the process shown in FIG. 5, the process of extracting the time-series signal from the first operation segment signal while shifting the time and calculating the degree of similarity between the extracted time-series signal and the template is sequentially executed. Accordingly, the time-series signal having the highest calculated degree of similarity can be detected as the second operation segment signal.

FIG. 6 is a diagram conceptually showing the second operation segment signal detection process shown in FIG. 5. In the example shown in FIG. 6, when the beginning of the first operation segment signal is set to 0 sec, the degree of similarity to the template waveform is the maximum when the time-series signal is cut out with the position of 0.1 sec as the starting point position. In this case, the second operation segment signal is detected with the position of 0.1 sec of the first operation segment signal having the maximum degree of similarity as the starting point position.

In the embodiment, the second operation segment signal detected by executing the process shown in FIG. 5 described above is transmitted to the server device 40, and is stored (accumulated) in the second operation segment storage 41 included in the server device 40 in association with the information indicating the date and time when the second operation segment signal was detected.

As described above, in the embodiment, the time-series signal related to the condition of the monitored target 20 is acquired from the first sensor (for example, a microphone), the operation timing information indicating the start of the operation of the monitored target 20 is acquired, and based on the operation timing information, the first operation segment signal is detected from the time-series signal. In this case, the operation timing information is acquired by using the second sensor (for example, distance measuring sensor) whose sampling time resolution is lower than that of the first sensor. Further, of the time-series signal acquired from the first sensor, the time-series signal in a segment until a predetermined time elapses is detected as the first operation segment signal at least after the operation timing information is acquired.

Further, in the embodiment, based on the characteristic of the waveform of the first operation segment signal, the second operation segment signal is detected from the first operation segment signal, and based on the second operation segment signal, the condition of the monitored target 20 is determined. In this case, the second operation segment signal is detected using the template stored in the template storage 16 as described above, and the condition of the monitored target 20 is determined using the trained model stored in the model storage 17.

In the embodiment, with such a configuration, it is possible to determine the condition of the monitored target 20 in real time.

Figure 7:
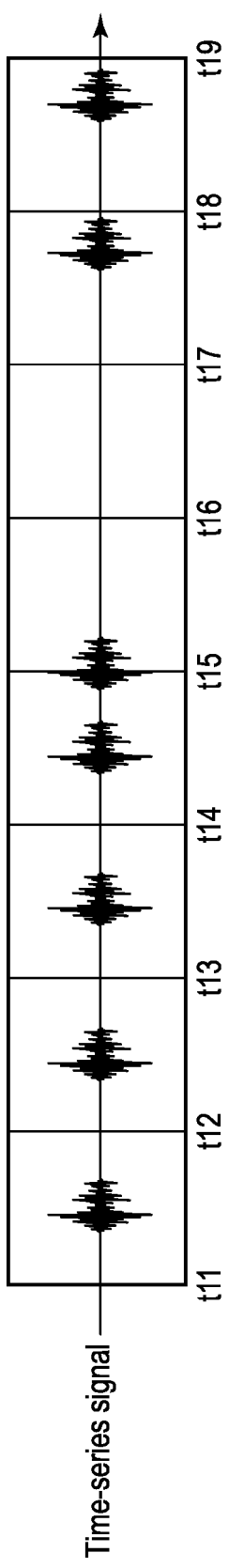
FIG. 7 is a diagram for explaining the operation of a comparative example of the embodiment.

Here, for example, as shown in FIG. 7, it is assumed that the monitored target 20 is constantly monitored using the time-series signal measured by the first sensor (hereinafter, referred to as a comparative example of the embodiment). In the example shown in FIG. 7, the condition of the monitored target 20 is determined based on the time-series signal in each segment from time t11 to time t19.

Generally, in a production line, products are continuously flowed at intervals of, for example, about several seconds, but the intervals are often not constant. In addition, the flow in the production line may be temporarily interrupted due to the end of a lot, detection of a defective product, or the like.

For example, when the operation interval of the monitored target 20 is temporarily shortened from time t14 to time t16 shown in FIG. 7, (waveform of) the time-series signal resulting from one operation of the monitored target 20 is divided into the segment from time t14 to time t15 and the segment from time t15 to time t16, so that in the above comparative example it is difficult to accurately determine the condition. Further, according to the comparative example, unnecessary processing (condition determination processing) may be executed even in a segment in which the monitored target 20 is not operating, for example, a segment from time t16 to time t17 shown in FIG. 7.

Figure 8:
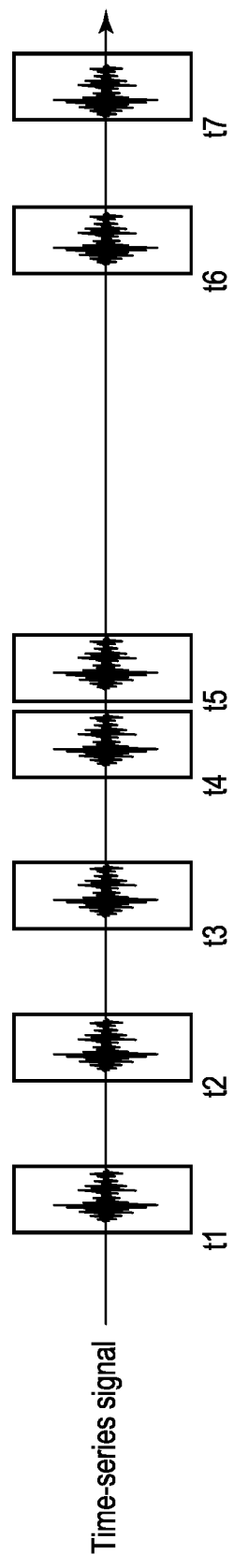
FIG. 8 is a diagram for explaining the operation of the condition monitoring device according to the embodiment in comparison with the operation of the comparative example.

On the contrary, in the condition monitoring device 10 according the embodiment, as shown in FIG. 8, the condition of the monitored target 20 is determined by detecting the time-series signal (second operation segment signal) in a segment until a given time elapses from each of the time t1 to time t7. According to this, compared with the above-mentioned comparative example (configuration in which the time-series signal is constantly monitored), it is possible to secure the time to execute the condition determination process until the next operation timing signal is acquired after, for example, the second operation segment signal is detected, so that it is possible to improve (maintain) the real-time property of the determination (monitoring) of the condition of the monitored target 20 even when, for example, there is a delay in the determination process. Further, the embodiment makes it possible to reduce the processing amount and reduce the power consumption in the condition monitoring device 10 as compared with the comparative example. Further, in the embodiment, it is possible to avoid the monitoring omission of the condition of the monitored target 20 by surely grasping the start of the operation of the monitored target 20 using the operation timing information.

In addition, in the above-mentioned comparative example, the time-series signal, in each segment, for determining the condition of the monitored target 20 vary in the time direction, but in the embodiment, it is possible to reduce the variation, and as a result, the accuracy of the condition determination (that is, the accuracy of anomaly determination) can be improved.

Furthermore, in order to suppress the influence of the above-mentioned variation in the time direction in the comparative example, for example, the time-series signal may be converted into an amplitude spectrum or a power spectrum and used, and the phase information of the time-series signal may not be used, but in the embodiment, such phase information can be included, so that it is possible to further improve the determination accuracy of the condition.

In the embodiment, although the description has been made assuming that the first operation segment signal is detected from the time-series signal that is continuously acquired by the time-series signal acquisition unit 11 based on operation timing information, for example, the first sensor may be driven at the timing when the operation timing information is acquired, and the first operation segment signal may be acquired from the first sensor. In such a configuration, the driving of the first sensor is stopped when the first operation segment signal is acquired (that is, when a given time has elapsed after the operation timing information was acquired). According to this, it is not necessary to constantly drive the first sensor, so that it is possible to reduce power consumption when monitoring the condition of the monitored target 20.

Here, in the embodiment, the configuration using the template makes it possible to detect the second operation segment signal similar to the time-series signal to be detected. According to this, it is possible to detect the appropriate second operation segment signal, and it is possible to improve the determination accuracy of the condition of the monitored target 20 using the second operation segment signal.

However, since the monitored target 20 such as a press machine is repeatedly operated every day, the press machine deteriorates over time. As a result, the second operation segment signal detected from the sound (the first operation segment signal) generated during the press working in the press machine may change depending on the aging deterioration even when the condition of the press machine is normal.

As described above, detecting the second operation segment signal using the template (template prepared in advance) generated based on the time-series signal (second operation segment signal) before the change due to the aging deterioration despite the time-series signal detected as the second operation segment signal changing according to the aging deterioration may be a factor that lowers the accuracy of determining the condition of the monitored target 20. That is, when the template as described above is continuously used, it is not possible to perform the condition monitoring in accordance with the aging deterioration.

Therefore, in the embodiment, the template updating unit 42 included in the server device 40 described above updates the template stored in the template storage 16.

Hereinafter, with reference to the flowchart of FIG. 9, an example of a processing procedure of the process of updating a template (hereinafter referred to as a template updating process) will be described. In the following description, the template stored in the template storage 16 included in the condition monitoring device 10 at the time when the template updating process is started is referred to as a pre-update template.

Although the description is made assuming that the template updating process is executed by the template updating unit 42 included in the server device 40, the template updating process may be executed by the condition monitoring device 10.

First, the template updating unit 42 determines whether it is time to update the pre-update template (hereinafter, simply referred to as template update timing) (step S21).

In step S21, for example, it may be determined that it is time to update the pre-update template when a predetermined date and time is reached, or for example, it may be determined that it is time to update the pre-update template when the administrator of the condition monitoring device 10 or the server device 40 gives an instruction to update the pre-update template.

Furthermore, in the process (second operation segment signal detection process) shown in FIG. 5 executed before the template updating process is executed as described above, the second operation segment signal is detected using the pre-update template, but the template update timing may be determined based on the difference between the pre-update template and the second operation segment signal detected using the pre-update template. That is, even when the time-series signal having the highest degree of similarity to the template waveform defined in the pre-update template is detected as the second operation segment signal by executing the process of FIG. 5 described above, it is determined that the pre-update template is required to be updated (that is, it is time to update the pre-update template) when (waveform of) the second operation segment signal is different from (template waveform defined in) the pre-update template.

Specifically, the template updating unit 42 calculates the absolute value of the difference amplitude between the pre-update template and the second operation segment signal, for example, in sampling cycle unit and uses a representative value (average value, maximum value, minimum value, or the like) of the absolute value of the difference amplitude for the time length (the number of samples) of the pre-update template as the difference between the pre-update template and the second operation segment signal. Alternatively, the template updating unit 42 may use the sum of squares (power) or the logarithm of the sum of squares (logarithm power) for a given time length with respect to the difference amplitude as the difference between the pre-update template and the second operation segment signal. According to this, when the difference between the pre-update template and the second operation segment signal exceeds the predetermined value (given value), it is possible to determine that it is time to update the pre-update template.

The determination process of the template update timing based on the difference between the pre-update template and the second operation segment signal may be executed by dividing the pre-update template and the second operation segment signal into a plurality of time widths. In this case, it may be determined that it is time to update the pre-update template when the difference between the pre-update template and the second operation segment signal in the specific time width exceeds a given value, it may be determined that it is time to update the pre-update template when the difference between the pre-update template and the second operation segment signal exceeds a given value in a predetermined number or more of time widths of the plurality of time widths sectioned.

When the template update timing is determined based on the difference between the pre-update template and the second operation segment signal as described above, the pre-update template may not be updated for a long time depending on the difference. For this reason, for example, when a predetermined period has elapsed from the last template update timing (that is, the timing at which the past template stored in the template storage 16 was updated to the pre-update template), it may be determined that it is time to update the pre-update template. Note that the last template update timing is assumed to be managed in, for example, the server device 40 according to the execution of the process shown in FIG. 9.

When it is determined in step S21 that it is not time to update the pre-update template (NO in step S21), the process of step S21 is repeated until it is determined that it is time to update the pre-update template.

On the other hand, when it is determined in step S21 that it is time to update the template (YES in step S21), the template updating unit 42 acquires the second operation segment signal stored in the second operation segment storage 41 (step S22).

Here, the second operation segment storage 41 stores the second operation segment signal in association with the date and time when the second operation segment signal was detected, for example. In this case, in step S22, for example, the second operation segment signal detected for the lapse of a predetermined period from the last template update timing (that is, the second operation segment signal stored in the second operation segment storage 41 in associated with the corresponding date and time for the lapse of the predetermined period from the last template update timing) is acquired from the second operation segment storage 41.

The second operation segment signal acquired in step S22 may be the second operation segment signal detected within the latest predetermined period (that is, during the past certain period) before the time when it is determined that it is time to update the pre-update template in step S21. Further, the second operation segment signal acquired in step S22 may be the second operation segment signal detected between the last template update timing and the current template update timing (the time when it is determined that it is time to update the pre-update template in step S21).

Here, although the description is made assuming that both the second operation segment signal when the condition is determined to be "normal" and the second operation segment signal when the condition is determined to be "anomalous" are acquired, in step S22, the second operation segment signal when the condition is determined to be "normal" may be acquired (that is, the second operation segment signal when the condition is determined to be "anomalous" is excluded). However, since many of the second operation segment signals stored in the second operation segment storage 41 are those when the condition is determined to be "normal", even when the configuration is such that both the second operation segment signal when the condition is determined to be "normal" and the second operation segment signal when the condition is determined to be "anomalous" are acquired, it is possible to reduce the influence of the second operation segment signal when it is determined that the condition is "anomalous" by the averaging process described later.

Next, the template updating unit 42 generates a new template (hereinafter referred to as a post-update template) based on the second operation segment signal acquired in step S22 (step S23). In step S23, for example, the template defined by the average waveform of the second operation segment signal (waveform) acquired in step S22 is generated as the post-update template.

The post-update template may be generated using part of the second operation segment signal acquired in step S22. Specifically, the post-update template may be generated using the second operation segment signal acquired in step S22 from which the second operation segment signal with a large distance (that is, low similarity) from the centroid (central or representative waveform) is excluded using, for example, one class support vector machine (one class SVM). Alternatively, the second operation segment signal acquired in step S22 is clustered into a plurality of groups, the second operation segment signal belonging to the group with a large distance (that is, low similarity) from the centroid (central or representative waveform) is excluded, and the post-update template may be generated.

The post-update template generated in step S23 is transmitted to the condition monitoring device 10 and stored in the template storage 16 included in the condition monitoring device 10. As a result, the pre-update template stored in the template storage 16 is updated to the post-update template (step S24).

When the pre-update template is updated to the post-update template by executing the process shown in FIG. 9 above, in the process shown in FIG. 3 (and FIG. 5) executed later, the second operation segment signal is detected using the post-update template.

Figure 9:
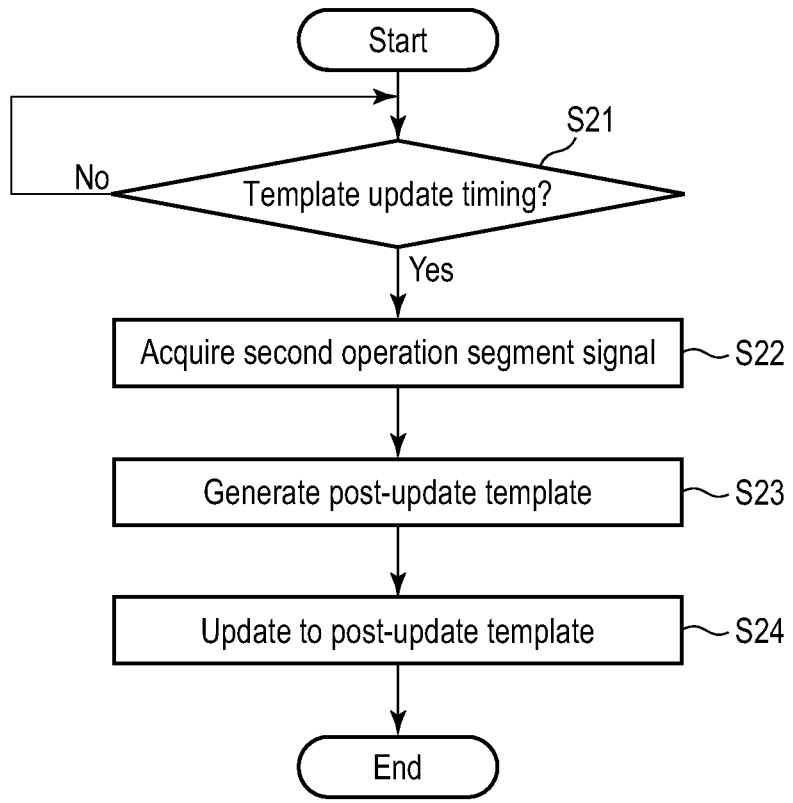
FIG. 9 is a flowchart showing an example of a processing procedure of a template updating process.

The validity of the post-update template may be verified after the process shown in FIG. 9 is executed. In this verification process, for example, when it is possible to detect the waveform (second operation segment signal) with the effective amplitude using the post-update template, and when there is little variation between the second operation segment signals, it can be determined that the post-update template is valid. Furthermore, the verification process may be performed based on the difference between (the template waveform defined in) the post-update template and (the waveform of) the second operation segment signal detected using the post-update template. According to this, when the difference between the post-update template and the second operation segment signal is less than a predetermined given value, it can be determined that the post-update template is valid.

When it is determined that the post-update template is not valid in such a verification process, the post-update template may be discarded, and the pre-update template may be continuously used, or the process of generating the post-update template using the second operation segment signal different from the second operation segment signal used when the post-update template is generated (that is, the process of steps S22 to S24) may be executed again.

The template update timing described with reference to FIG. 9 is an example. That is, in the embodiment, the template stored in the template storage 16 may be updated at timing other than the above timing as long as it is updated regularly.

As described above, in the embodiment, it is possible to realize the condition monitoring in accordance with the aging deterioration by regularly updating the template stored in the template storage 16.

Although the case of updating the template is described here, the same can apply for the trained model stored in the model storage 17. That is, when the trained model generated by learning the second operation segment signal before the change due to the aging deterioration occurs is used in order to determine the condition of the monitored target 20 that has deteriorated over time, the accuracy of determination of the condition of the monitored target 20 may deteriorate (that is, the condition monitoring in accordance with the aging deterioration may not be performed).

Here, with reference to FIG. 10, the anomaly score that changes due to the aging deterioration of the monitored target 20 will be described. As described above, the condition of the monitored target 20 is determined based on the anomaly score. When the trained model stored in the model storage 17 is the above-mentioned first model, the anomaly score is calculated based on the error between the input signal to the first model and the output signal from the first model.

Figure 10:
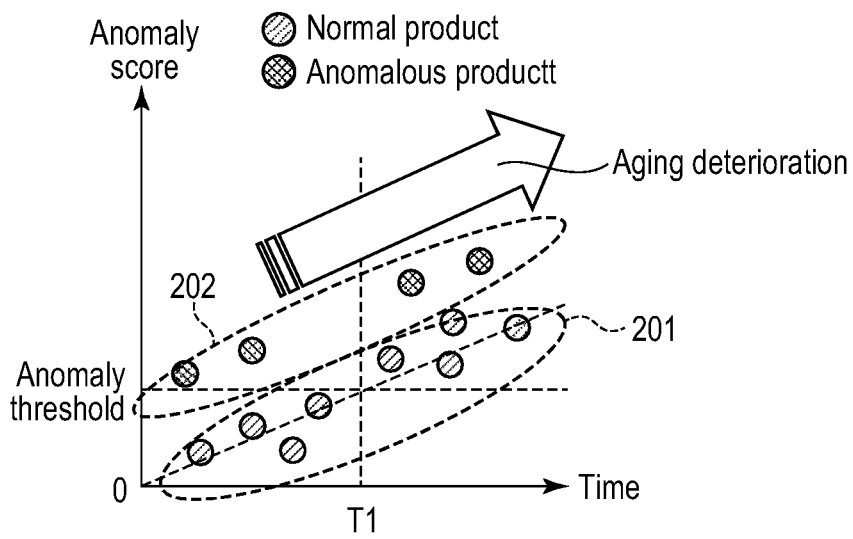
FIG. 10 is a diagram for explaining an anomaly score that changes due to aging deterioration of a monitored target.

An anomaly score group 201 shown in FIG. 10 indicates the anomaly score calculated when the monitored target 20 is in a normal condition. On the other hand, an anomaly score group 202 shows the anomaly score calculated when the monitored target 20 is in an anomalous condition. Note that the anomaly score groups 201 and 202 are calculated using one (same) trained model stored in the model storage 17.

According to the anomaly score groups 201 and 202 shown in FIG. 10, whether the monitored target 20 is in a normal condition or an anomalous condition, it is shown that the anomaly score tends to be calculated higher as the time elapses (that is, the deterioration over time progresses).

Here, in the period from the start of operation of the condition monitoring device 10 to, for example, the date and time Tl, the anomaly score group 201 is less than the anomaly threshold when the monitored target 20 is in a normal condition, and the anomaly score group 202 is equal to or higher than the anomaly threshold when the monitored target 20 is in an anomalous condition, so that the condition of the monitored target 20 can be appropriately determined.

However, after the date and time Tl, even when the monitored target 20 is in a normal condition, the anomaly score group 201 exceeds the anomaly threshold due to the aging deterioration of the monitored target 20, so that the condition of the monitored target 20 will be determined to be "anomalous".

That is, in the embodiment, the trained model stored in the model storage 17 is required to be updated so as to be able to properly determine the condition of the monitored target 20 based on the anomaly threshold even when the monitored target 20 deteriorates over time.

Hereinafter, with reference to the flowchart of FIG. 11, an example of a processing procedure of the process of updating a trained model (hereinafter, referred to as a model updating process) will be described. In the following description, the trained model stored in the model storage 17 included in the condition monitoring device 10 at the time when the model updating process is started is referred to as a pre-update model.

Although the description is made assuming that the model updating process is executed by the model updating unit 43 included in the server device 40, the model updating process may be executed by the condition monitoring device 10.

First, the model updating unit 43 determines whether it is time to update the pre-update model (hereinafter, simply referred to as a model update timing) (step S31).

In step S31, for example, it may be determined that it is time to update the pre-update model when a predetermined date and time is reached, or for example, it may be determined that it is time to update the pre-update model when the administrator of the condition monitoring device 10 or the server device 40 gives an instruction to update the pre-update model.

Furthermore, in the process shown in FIG. 3 executed before the model updating process is executed as described above, the condition of the monitored target 20 is determined based on the anomaly score calculated using the pre-update model, but the model update timing may be determined based on the change in the distribution (statistics) of the anomaly score. In this case, the model updating unit 43 creates a histogram in which, for example, the vertical axis represents the frequency and the horizontal axis represents the anomaly score (histogram representing the distribution of the anomaly score calculated using the pre-update model), and the model update timing is determined by comparing the histogram (hereinafter, referred to as a target histogram) with a histogram of reference (hereinafter, referred to as a reference histogram).

The reference histogram may represent the distribution of the anomaly score calculated when using the trained model that is previous to the pre-update model by one, for example, (that is, the trained model before updated to the pre-update model), or it may represent the distribution of the anomaly score calculated at the start of motion of the monitored target 20.

In this case, the model updating unit 43 can determine that it is time to update the pre-update model when the change amount of the statistic such as the average value or the variance value obtained by comparing the target histogram and the reference histogram exceeds a predetermined value (prescribed value). The configuration may be such that it is determined that it is time to update the pre-update model when the inter-distribution distance (for example, the KL distance or the Pearson distance) in the target histogram and the reference histogram exceeds a prescribed value.

When the model update timing is determined based on the target histogram and the reference histogram as described above, the pre-update model may not be updated for a long period of time depending on the change (amount) of distribution of the anomaly score. For this reason, for example, when a predetermined period has elapsed from the last model update timing (that is, the timing at which the past trained model stored in the model storage 17 was updated to the pre-update model), it may be determined that it is time to update the pre-update model. Note that the last model update timing is assumed to be managed in, for example, the server device 40 according to the execution of the process shown in FIG. 11.

The model update timing may be synchronized with the template update timing described above, and it may be determined that it is time to update the pre-update model at the timing at which it is determined that it is time to update the pre-update template in step S31 shown in FIG. 9.

When it is determined in step S31 that it is not time to update the pre-update model (NO in step S31), the process of step S31 is repeated until it is determined that it is time to update the pre-update model.

On the other hand, when it is determined that it is time to update the pre-update model in step S31 (YES in step S31), the model updating unit 43 acquires the second operation segment signal stored in the second operation segment storage 41 (step S32).

Here, as described above, the second operation segment storage 41 stores the second operation segment signal, for example, in association with the date and time when the second operation segment signal is detected. It is assumed that the condition of the monitored target 20 determined by the condition determination unit 15 based on the second operation segment signal (that is, "normal" or "anomalous" which is the determination result by the condition determination unit 15) is further associated with the second operation segment signal. In this case, in step S32, for example, the second operation segment signal detected for the lapse of a predetermined period from the last template update timing and associated with "normal" is acquired from the second operation segment storage 41.

Although the description has been made assuming that the second operation segment signal is stored in association with the date and time, as long as it is possible to grasp the date and time when the second operation segment signal is detected, for example, the second operation segment signal may be stored with a time stamp in units of milliseconds or microseconds added based on the system time such as the UNIX (registered trademark) time.

The second operation segment signal acquired in step S32 may be the second operation segment signal detected within the latest predetermined period (that is, during the past certain period) before the time when it is determined that it is time to update the pre-update model in step S31. In addition, the second operation segment signal acquired in step S32 may be the second operation segment signal detected between the last model update timing and the current model update timing (the time when it is determined that it is time to update the pre-update model in step S31).

Next, the model updating unit 43 generates the post-update model based on the second operation segment signal acquired in step S32 (step S33). Note that this post-update model may be a new trained model generated by learning the second operation segment signal acquired in step S32, or may be a trained model generated by further causing the pre-update model to learn the second operation segment signal (that is, the pre-update model updated based on the second operation segment signal).

The post-update model generated in step S33 is transmitted to the condition monitoring device 10 and stored in the model storage 17 included in the condition monitoring device 10. As a result, the pre-update model stored in the model storage 17 is updated to the post-update model (step S34).

When the pre-update model is updated to the post-update model by executing the process shown in FIG. 11 described above, the condition of the monitored target 20 is determined using the post-update model, in the process shown in FIG. 3 to be executed later.

Figure 11:
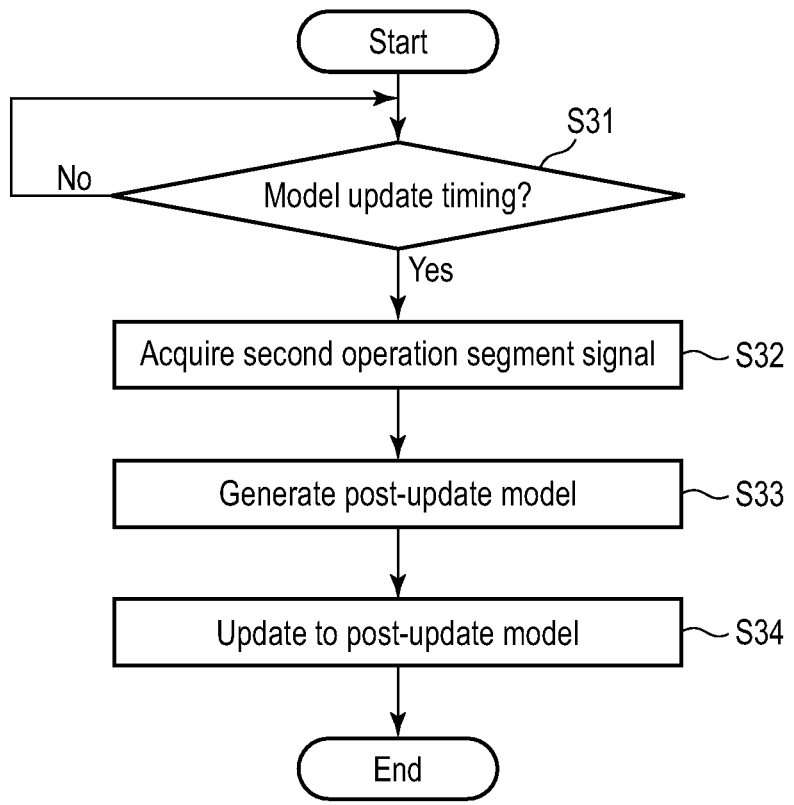
FIG. 11 is a flowchart showing an example of a processing procedure of a model updating process.

Although detailed description is omitted, after the process shown in FIG. 11 is executed, using the second operation segment signal associated with "anomalous" in addition to the second operation segment signal associated with "normal" acquired from the second operation segment storage 41, for example, the validity of the post-update model may be verified by cross validation or the like.

The model update timing described with reference to FIG. 11 is an example. That is, in the embodiment, the trained model stored in the model storage 17 may be updated at timing other than the above timing as long as it is updated regularly.

Figure 12:
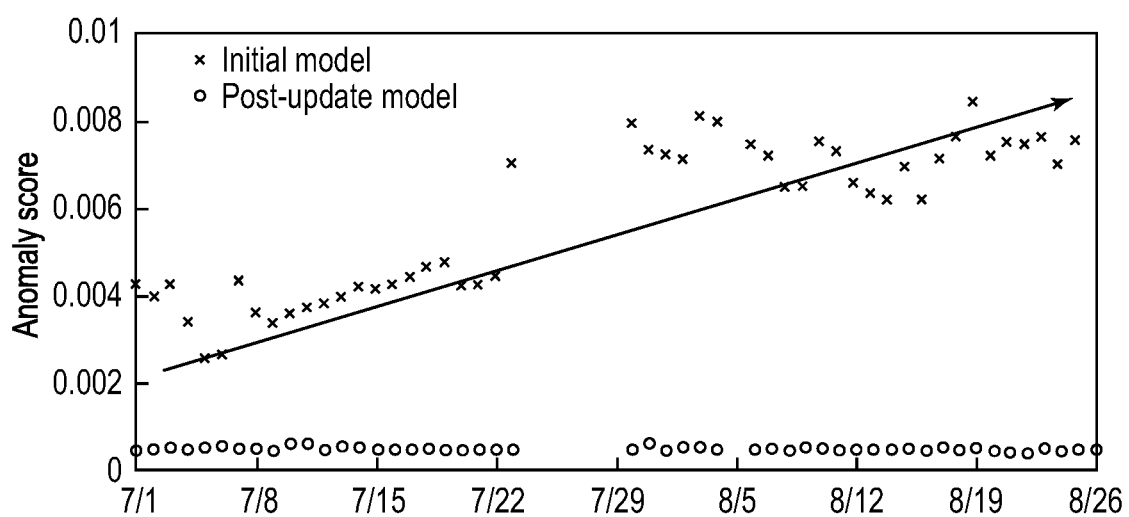
FIG. 12 is a diagram for comparing and explaining the anomaly score calculated using the pre-update model and the post-update model.

FIG. 12 shows the comparison between, for example, the anomaly score calculated by continuously using the trained model (hereinafter, initial model) prepared when the operation of the condition monitoring device 10 is started, and the anomaly score calculated using the post-update model that is updated regularly as described in the embodiment. FIG. 12 shows that while the anomaly score gradually increases with the monitored target 20 deteriorating over time when using the initial model, the increase in the anomaly score according to the aging deterioration is suppressed, and a stable anomaly score is calculated when using the post-update model that is updated regularly.

That is, in the embodiment, the condition monitoring in accordance with the aging deterioration can be realized by regularly updating the trained model.

Here, it is assumed that, as described above, the monitored target 20 is, for example, a press machine that presses a product with a mold in a production line of a manufacturing factory, and the condition monitoring device 10 according to the embodiment is used in shipping inspection of the product. In this case, when the condition monitoring device 10 (condition determination unit 15) determines that the condition of the monitored target 20 is "normal", it means that the product produced by the operation of the monitored target 20 (that is, press working performed by the press machine) is normal. However, even when the product is once shipped since the condition of the monitored target 20 is determined to be "normal", there may be a case where the product is returned due to an initial defect or the like occurring in the product. In such cases, the trained model (pre-update model) may be updated in consideration of the second operation segment signal (hereinafter referred to as the second operation segment signal of a returned product) detected from the time-series signal including the sound waveform generated when pressing the product that is to be returned (hereinafter referred to as a returned product) with a mold. The second operation segment storage 41 stores (accumulates) the second operation segment signal. It is assumed that (processing number assigned to) the returned product pressed by the press machine that is the monitored target 20 and the second operation segment signal of the returned product are managed in association with each other in the second operation segment storage 41.

Hereinafter, with reference to FIG. 13, the process of updating the trained model based on the second operation segment signal of the returned product will be described.

Figure 13:
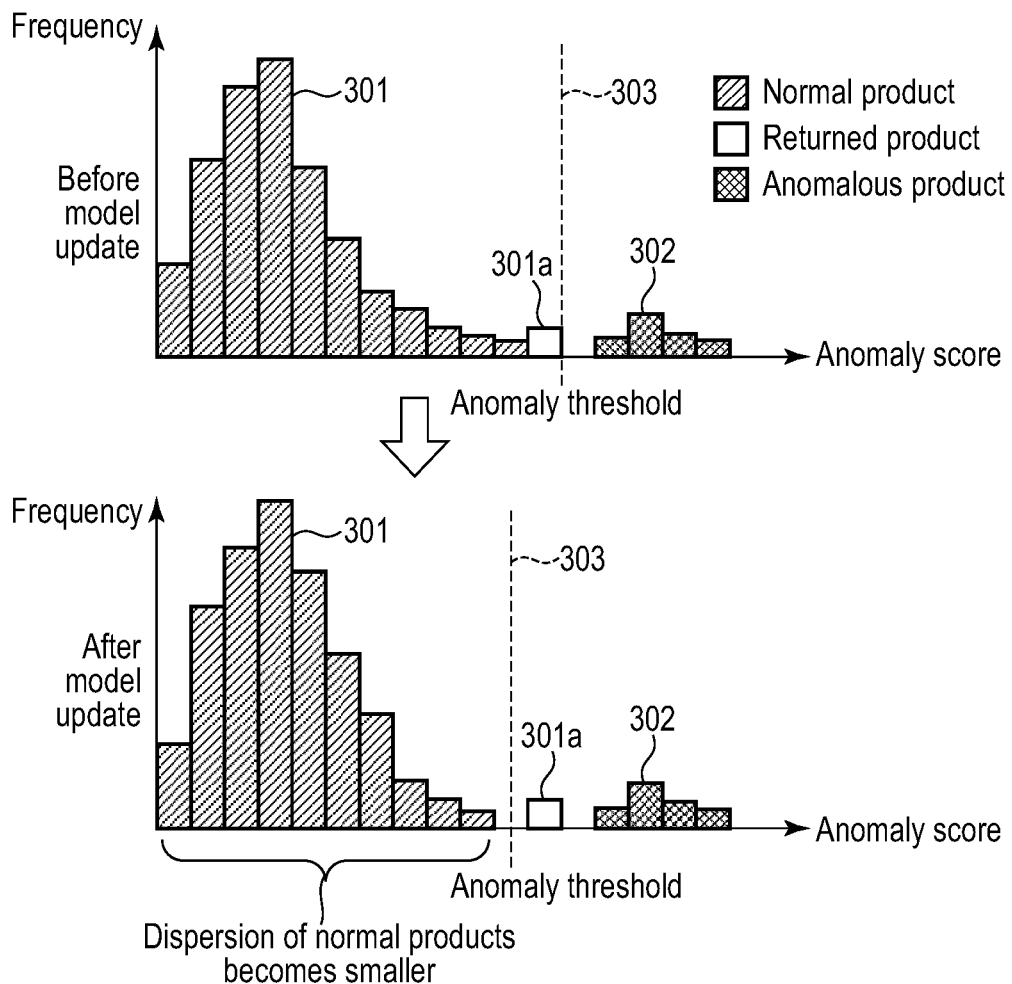
FIG. 13 is a diagram for explaining an example of an update process of a trained model based on a second operation segment signal of a returned product.

FIG. 13 conceptually shows the distribution of the product shipped after determined by the condition monitoring device 10 that the condition of the monitored target 20 (press machine) is "normal" (hereinafter referred to as a "normal product"), and the product that was not shipped after determined that the condition of the monitored target 20 is "anomalous" (hereinafter referred to as an anomalous product). An anomaly threshold 303 shown in FIG. 13 represents a value (boundary) for determining a normal product and an anomalous product by using the trained model.

Here, a returned product 301*a* is a product that was once shipped after determined that the condition of the monitored target 20 is "normal" based on the anomaly threshold 303 shown in the upper part of FIG. 13, and was then returned due to an initial defect or the like. In this case, the trained model (pre-update model) excludes the second operation segment signal (operation sound at the shipping) of the returned product 301*a* stored in the second operation segment storage 41, and additionally learns the second operation segment signal of another normal product 301. According to this, the variance of the distribution of the "normal" histogram is smaller by excluding the returned product, and it is possible to generate a new trained model (that is, the post-update model) in which (the anomaly score of) the returned product 301*a* is not less than the anomaly threshold 303 as shown in the lower part of FIG. 13 by adjusting the anomaly threshold 303. According to such a configuration, since it is possible to easily set the threshold with a margin by reducing the variance of the normal product 301, it is possible to improve the accuracy of determination of the condition of the monitored target 20 as compared with simply adjusting the anomaly threshold.

Figure 14:
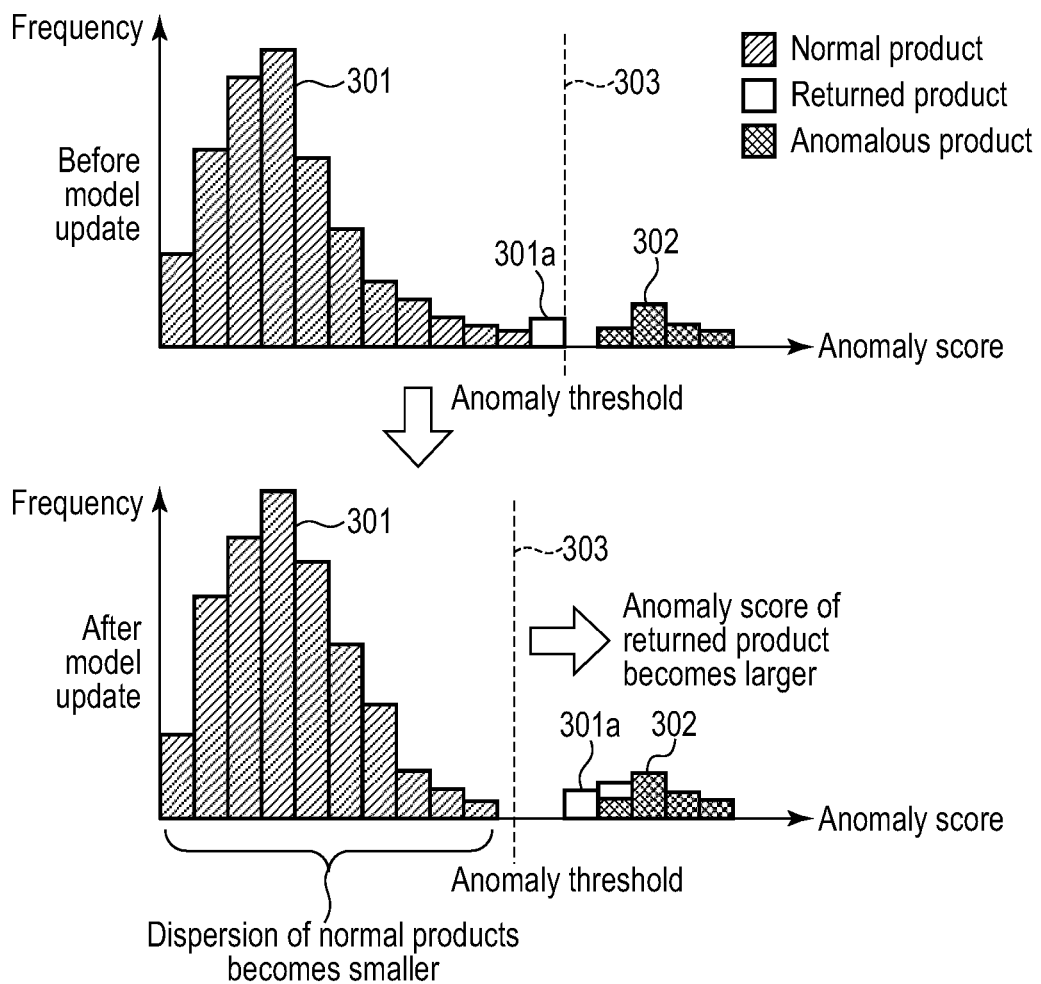
FIG. 14 is a diagram for explaining another example of an update process of a trained model based on a second operation segment signal of a returned product.

In addition, in FIG. 13, the case where the trained model by unsupervised learning that is learning with only normal data is updated is described, but the trained model may be updated by learning using a small amount of anomalous data in addition to normal data (hereinafter, referred to as partially supervised learning). That is, in FIG. 13 described above, although the description has been made assuming that the second operation segment signal (operation sound at the shipping) of the returned product 301*a* is excluded from learning, when a certain tendency can be observed in the second operation segment signal (operation sound at the shipping) of the returned product 301*a*, the second operation segment signal of the returned product 301*a* may be used for additional learning. In this case, as shown in FIG. 14, by performing learning so that the returned product 301*a* is away from the normal product, the anomaly score of the returned product 301*a* can be increased. For partially supervised learning, a method of devising a loss function so as to separate the anomalous product from a normal product or a method called (deep) metric learning may be used.

Note that in step S31 shown in FIG. 11, the model update timing is described using some examples. When the update process of the trained model based on the second operation segment signal of the returned product as described above is executed, it may be determined that it is time to update the pre-update model when the number of returned products reaches a prescribed number.

In the embodiment, the configuration in which the template used for detecting the second operation segment signal and the trained model used for determining the condition of the monitored target 20 are updated is described. The condition monitoring device 10 according to the embodiment may be configured to update at least one of the template and the trained model.

Further, in the embodiment, although the description has been made assuming that the first sensor that measures the signal related to the condition of the monitored target 20 is the microphone, but the first sensor may be other than the microphone. As the first sensor other than the microphone, for example, an acceleration sensor, a vibration sensor, an acoustic emission (AE) sensor, or the like can be used. In this case, for example, it is possible to measure acceleration, vibration, and AE that occur when the press machine presses.

Furthermore, the first sensor may be, for example, a Doppler sensor or a distance measuring sensor, depending on the type of the monitored target 20. When using the Doppler sensor as the first sensor, by emitting radio waves from the Doppler sensor towards the monitored target 20, and detecting the reflected wave from the monitored target 20 at the Doppler sensor, the position or movement of the monitored target 20 can be measured. Further, when a distance measuring sensor is used as the first sensor, the distance between the distance measuring sensor and the monitored target 20 (that is, the position or movement of the monitored target 20) can be measured, for example, using light or ultrasonic waves.

The first sensor described here is an example, and the first sensor may measure, for example, (a signal of) at least one of sound, vibration, light, and radio waves generated when the monitored target 20 operates. Further, as described above, various sensors can be used as the first sensor, but which sensor is used as the first sensor may be appropriately selected according to (the type of) the monitored target 20.

Furthermore, in the embodiment, although the description has been made assuming that the second sensor that measures the signal corresponding to the operation timing information indicating the start of the operation of the monitored target 20 is the distance measuring sensor, the second sensor may be an acceleration sensor. In this case, the operation timing information acquisition unit 12 can acquire operation timing information related to the posture or operation of the monitored target 20 according to the acceleration measured by the acceleration sensor.

Further, the second sensor may be a Doppler sensor or a distance measuring sensor. When the Doppler sensor is used as the second sensor, the operation timing information acquisition unit 12 can acquire operation timing information related to the position or movement of the monitored target 20 measured by the Doppler sensor. Further, when the distance measuring sensor is used as the second sensor, it is possible to acquire operation timing information related to the distance between the distance measuring sensor and the monitored target 20 measured by the distance measuring sensor.

Further, in the embodiment, although the description has been made assuming that the second sensor is used to acquire the operation timing information, but the operation timing information may be any information indicating the start of the operation of the monitored target 20. Therefore, for example, when the operation of the monitored target 20 is controlled by a predetermined program, a signal for controlling the operation of the monitored target 20 may be acquired as the operation timing information.

In the embodiment, although the description has been made assuming that, for example, the condition monitoring device 10 is used for the shipping inspection of the product to be pressed by the press machine in the production line of the manufacturing factory, the template stored in the template storage 16 included in the condition monitoring device 10 and the trained model stored in the model storage 17 are shared with other devices that perform a regular inspection of products after shipping (that is, the template and the trained model may be used in a place other than the manufacturing factory). According to this, it is possible to realize a longer-term condition monitoring of the monitored target 20.

Further, the anomaly score of the monitored target 20 described in the embodiment can be considered as the degree of deterioration of the monitored target 20. In this case, the result of the above-described regular inspection of the product (degree of deterioration of the monitored target 20) may be used for the assessment (that is, price calculation) of the product or the like.

Further, in the case where the product to be pressed in the above-mentioned press machine includes a plurality of components (parts), the degree of deterioration for each component is calculated, and the degree of deterioration (anomaly score) may be calculated in comprehensive consideration of the degree of deterioration calculated for each component.

In the above-described embodiment, although the description has been mainly made assuming that the monitored target 20 is the press machine used in the production line of the manufacturing factory, the monitored target 20 may be another device such as a rotating machine such as a fan or a motor, a cutting machine, an electric motor, or a variable speed engine. Further, the monitored target 20 may be other than the devices provided in the above-mentioned manufacturing structure, plant, construction site, educational institution, medical institution or housing facility, for example, it may be an outdoor space, an indoor space, a space of a company, or the like, or for example, it may be a living body such as a human or an animal.

In the embodiment, although the description has been made assuming that the time-series signal (first and second operation segment signals) is detected at the timing when the monitored target 20 (apparatus) starts the operation to determine the condition of the monitored target 20, when the monitored target 20 is a space, for example, the condition of the environment can be determined by detecting the time-series signal at the timing when the environment in the space changes. Further, when the monitored target 20 is a living body, it is possible to determine the condition of the living body by detecting the time-series signal such as a pulse waveform or an electrocardiographic waveform with a camera image or an electrocardiographic sensor at timing when the living body performs a given operation.

Second Embodiment

Next, a second embodiment will be described. In the first embodiment described above, although the description has been made assuming that the condition monitoring device determines the condition of the monitored target, the embodiment is different from the first embodiment in that the condition of the monitored target and the condition of the component (hardware component) of the monitored target used for the operation of the monitored target are determined.

Specifically, for example, when the monitored target is a press machine that presses a product with a mold in a production line of a manufacturing factory, the condition monitoring device according to the embodiment has a configuration that determines the condition (that is, processing anomaly) of the press machine (press working), and the condition (that is, mold anomaly) of the mold used for the press working.

The functional configuration of the condition monitoring device and the like according to the embodiment is the same as that of the first embodiment described above, and will be described with reference to FIG. 1 as appropriate.

Figure 15:
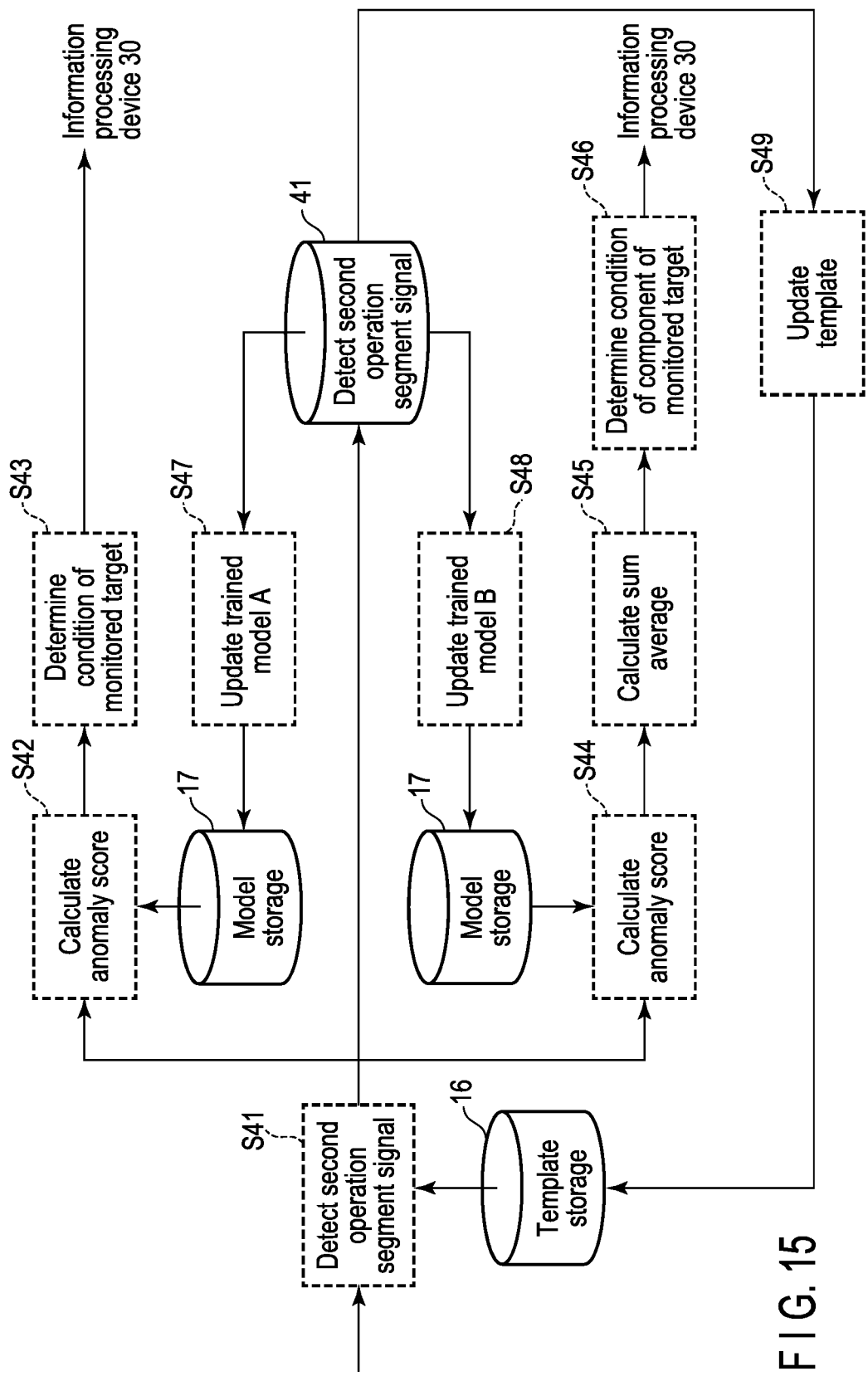
FIG. 15 is a diagram showing an outline of an operation of a condition monitoring device and a server device according to a second embodiment.

Hereinafter, with reference to FIG. 15, an outline of operations of the condition monitoring device 10 and the server device 40 according to the embodiment will be described. Detailed description of the same parts as those in the first embodiment will be omitted, and here, the parts different from those of the first embodiment will be mainly described.

First, when the process of steps S1 to S6 shown in FIG. 3 described above is executed, the second operation segment detection unit 14 included in the condition monitoring device 10 detects the second operation segment signal using the template stored in the template storage 16 (step S41).

Here, in the embodiment, it is assumed that the model storage 17 stores a trained model A (first trained model) that determines the condition of the monitored target 20 and a trained model B (second trained model) that determines the condition of the component of the monitored target 20.

In this case, the condition determination unit 15 included in the condition monitoring device 10 inputs the second operation segment signal detected in step S41 to the trained model A stored in the model storage 17 to calculate the anomaly score of the monitored target 20 by obtaining the output signal output from the trained model A (step S42).

When the process of step S42 is executed, the condition determination unit 15 determines the condition of the monitored target 20 based on whether the anomaly score calculated in step S42 is equal to or greater than the anomaly threshold (step S43). The determination result (condition of the monitored target 20) in step S43 is output to the information processing device 30.

Since the process of steps S42 and S43 is the same as that described in step S7 shown in FIG. 3 described above, detailed description thereof will be omitted here.

The process (that is, the process of steps S42 and S43) of determining the condition of the monitored target 20 (press machine) described above is executed every time the press machine which is the monitored target 20 presses the product (that is, every time the second operation segment signal is detected), as described in the first embodiment described above.

On the other hand, since the component (mold) of the monitored target 20 has durability, it is not necessary to determine the condition of the component for each press working. Therefore, it is assumed that the process of determining the condition of the component of the monitored target 20 is executed every predetermined period (for example, every day).

Specifically, for example, when determining the condition of the component of the monitored target 20 every day, the condition determination unit 15 acquires a plurality of second operation segment signals detected during one day in step S41 to input each of the plurality of second operation segment signals to the trained model B stored in the model storage 17. The condition determination unit 15 acquires the output signal output for each second operation segment signal from the trained model B to calculate the anomaly score of the component (here, the mold used for press working) of the monitored target 20 (step S44). In step S44, a plurality of anomaly scores corresponding to the plurality of second operation segment signals detected for one day is calculated. Note that the calculation process of the anomaly score is the same as that in step S42 described above, and thus detailed description thereof is omitted here.

Next, the condition determination unit 15 calculates the average value (sum average) of the plurality of anomaly scores calculated in step S44 (step S45).

When the process of step S45 is executed, the condition determination unit 15 determines the condition of the component of the monitored target 20 based on whether the average value of the anomaly scores calculated in step S45 is equal to or greater than the anomaly threshold (step S46). The determination result (condition of the component of the monitored target 20) in step S45 is output to the information processing device 30. Since the process of step S46 is similar to the process of step S43 described above, detailed description thereof will be omitted here.

Here, the second operation segment signal detected in step S41 is stored (accumulated) in the second operation segment storage 41 included in the server device 40 as described in the first embodiment.

In the embodiment, the trained model A stored in the model storage 17 is updated using the second operation segment signal thus stored in the second operation segment storage 41 (step S47). In this step S47, the process of steps S32 to S34 shown in FIG. 11 described above is executed.

As described above, while the trained model A is used to determine the condition of the monitored target 20 (press machine), the condition of the monitored target 20 is determined every time the press machine presses the product as described above. In this case, the mechanism that presses the product is susceptible to change (aging deterioration) as the mechanism presses the product the repeated number of times, and the press machine itself is changed with maintenance on the pressing mechanism performed regularly or according to the situation. For this reason, it is preferable to update the trained model A used for determining the condition of the monitored target 20 with high frequency. Therefore, the update process of the trained model A (process of step S47) in the embodiment is executed, for example, on a daily basis (that is, at timing of once a day). Note that the time interval (timing) at which the process of step S47 is executed may be set in advance.

Although the case where the trained model A is updated is described here, the trained model B is similarly updated using the second operation segment signal stored in the second operation segment storage 41 (step S48). As in the trained model A described above, in this step S48, the process of steps S32 to S34 shown in FIG. 11 is executed.

Although the trained model B is used to determine the condition of the component (mold) of the monitored target 20, it often takes a long time for the mold itself to deteriorate over time, and maintenance is infrequent, such as performing regular maintenance once a month. Further, the condition of the component of the monitored target 20 is determined at a lower frequency than the condition of the monitored target 20 described above (for example, every day), so that the trained model B used for determining the condition of the component of the monitored target 20 need not be updated as frequently as the trained model A. Therefore, the update process of the trained model B (process of step S48) in the embodiment is executed, for example, on a yearly basis (that is, at timing of once a year). The time interval (timing) at which the process of step S48 is executed may be set in advance.

That is, the update timing of the trained model in the embodiment may be determined according to the update timing of the monitored target 20 or the replacement timing of the component used for the monitored target 20.

Although a detailed explanation here is omitted, the second operation segment signal stored in the second operation segment storage 41 can be used to update the template stored in the template storage 16 (step S49). Note that in step S49, the above-described process shown in FIG. 9 may be executed.

As described above, in the embodiment, the condition of the monitored target 20 is determined using the trained model A updated at a first time interval, and the condition of the component of the monitored target 20 is determined using the trained model B updated at a second time interval. As described above, for example, when the monitored target 20 is a press machine, and the component of the monitored target 20 is a mold used for press working in the press machine, the second time interval at which the trained model B is updated is set longer than the first time interval at which the trained model A is updated. That is, in the embodiment, with the configuration in which the trained model A used to determine the condition of the monitored target 20 and the trained model B used to determine the condition of the component of the monitored target 20 are updated at different time intervals, for example, the monitoring of the condition of the monitored target 20 using the trained model A updated on a daily basis and the monitoring of the condition of the component of the monitored target 20 using the trained model B updated on a yearly basis can be coexistent, and it is possible to realize the condition monitoring according to each aging deterioration.

In the embodiment, although the description has been made assuming that the model storage 17 stores the trained model A and the trained model B, for example, when the operation of the condition monitoring device 10 is started, the model storage 17 may store only one trained model (initial model). In this case, the trained model (post-update model) obtained by updating the initial model stored in the model storage 17 at the first time interval may be used as the trained model A, and the trained model (post-update model) obtained by updating the initial model stored in the model storage 17 at the second time interval may be used as the trained model B.

Figure 16:
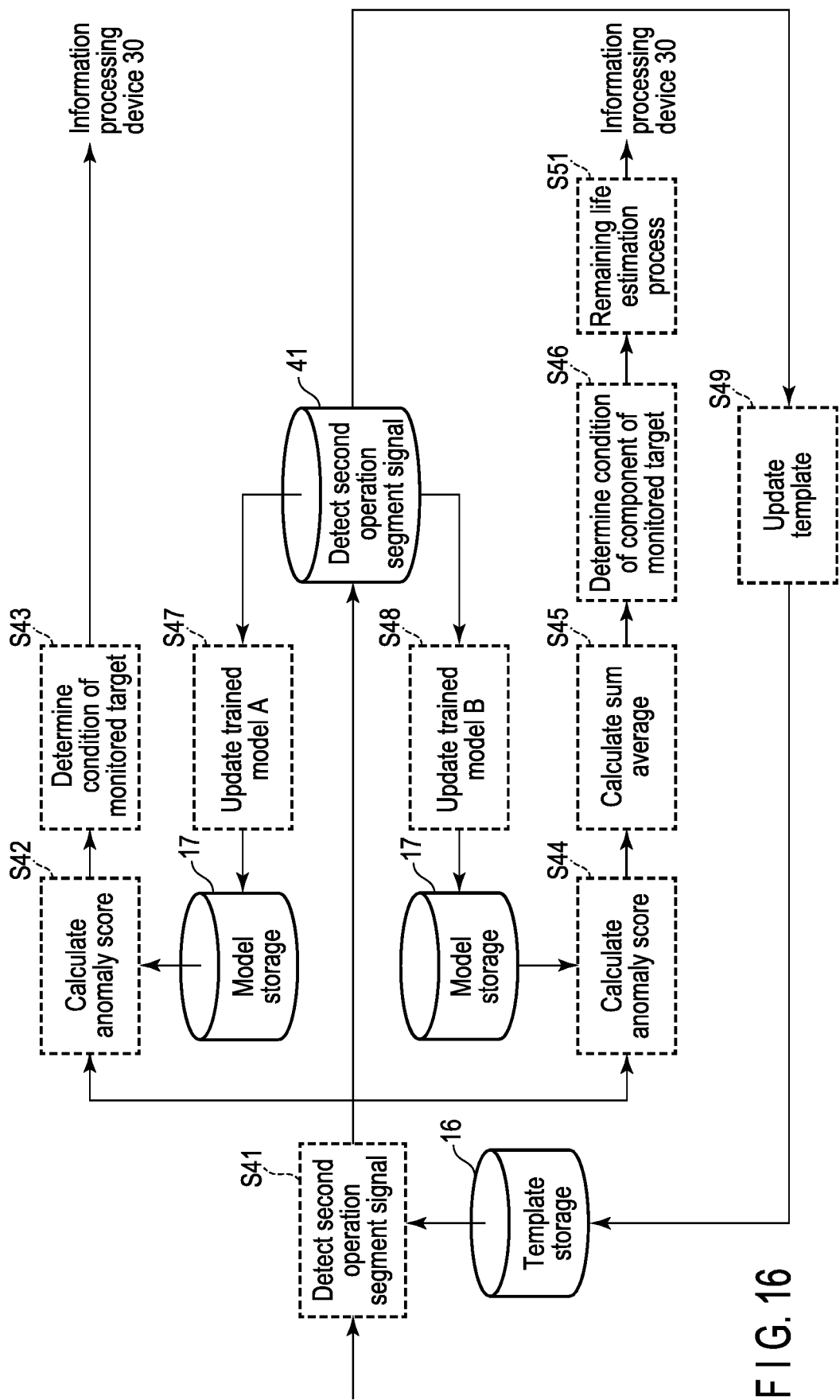
FIG. 16 is a diagram showing an outline of an operation of the condition monitoring device and the server device when a remaining life estimation process is further executed.

Here, in FIG. 15, although the description has been made assuming that the condition of the component of the monitored target 20 is determined based on the average value of anomaly scores, it is possible to provide a configuration in which, for example, the process of estimating the remaining life of the component (hereinafter, referred to as a remaining life estimation process) is further executed in step S51 as shown in FIG. 16.

It should be noted that the remaining life estimation process is executed when it is determined that the condition of the component of the monitored target 20 is "normal" as a result of the process of step S46 being executed. Although not shown in FIG. 16, when it is determined that the condition of the component of the monitored target 20 is "anomalous", the remaining life estimation process (process of step S51) is not executed, and the determination result may be output to the information processing device 30.

The remaining life estimation process will be specifically described below. The remaining life estimation process is executed by the condition determination unit 15 included in the condition monitoring device 10. In this remaining life estimation process, the anomaly score (average value) calculated in step S45 described above is used as the degree of deterioration of the component of the monitored target 20.

First, in the remaining life estimation process, a deterioration curve is generated based on the anomaly score calculated in step S45 (that is, the anomaly score calculated using the trained model B). Specifically, the deterioration curve is generated from the correspondence relationship between the anomaly score including the anomaly score calculated in the past and the operating time of the monitored target 20 at the time when the anomaly score is calculated. The operating time of the monitored target 20 may be managed in the condition monitoring device 10. For example, it may be input from an external system, or it may be generated by measuring the time during which, for example, the first sensor attached to the monitored target 20 is operating. Further, the operating time of the monitored target 20 may be acquired based on the date and time (the date and time when the second operation segment signal was detected) and the like associated with the second operation segment signal stored in the second operation segment storage 41.

Figure 17:
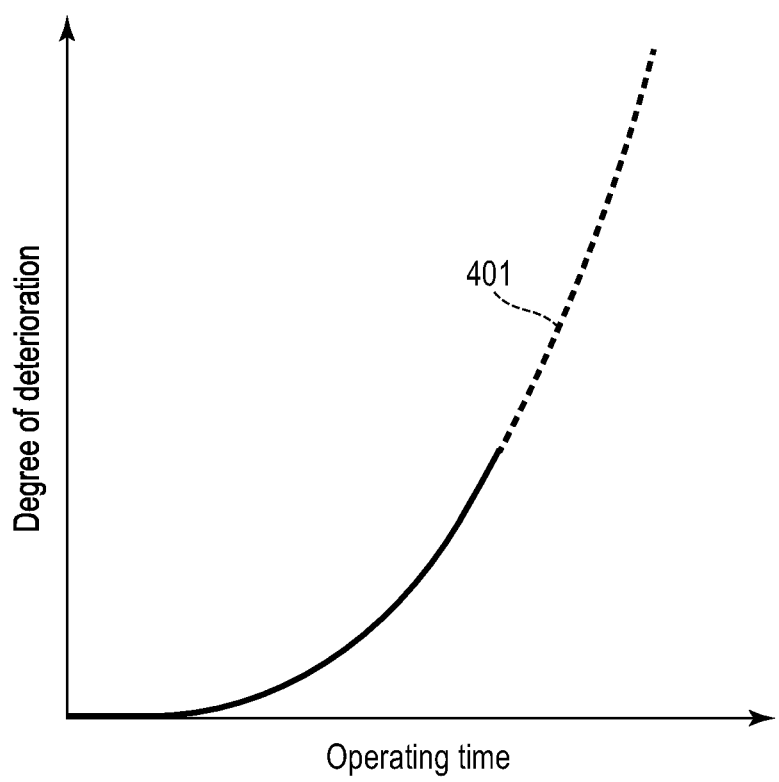
FIG. 17 is a diagram showing an example of a deterioration curve generated in the remaining life estimation process.

Here, FIG. 17 shows an example of a deterioration curve generated in the remaining life estimation process. The deterioration curve 401 shown in FIG. 17 shows (the prediction of) the change in the anomaly score with respect to the future operating time of the monitored target 20 estimated by plotting the above-described each anomaly score and the operating time of the monitored target 20 at the time when the anomaly score is calculated. Note that such a deterioration curve 401 is generated, for example, by performing function fitting on plots of the anomaly score and the operating time of the monitored target 20.

In the function fitting, various curves such as a polynomial curve, an exponential function, a conic curve, and a trigonometric function are assumed, and the optimum curve and coefficients in the function are determined in each operation. Further, all the plots may be fitted by partially different functions instead of by one function. Specifically, it is possible to perform fitting with a function representing a straight line up to a certain time point and fitting with an exponential function after the certain time point.

In the remaining life estimation process, the slope or the rate of change of the slope of the deterioration curve 401 generated as described above is calculated, and a point on the deterioration curve 401 at which the calculated slope or the calculated rate of change of the slope exceeds a given value is estimated as a failure point (timing at which a failure occurs). According to this, since it is possible to identify the operating time (failure operating time) of the monitored target 20 corresponding to the failure point based on the deterioration curve 401, the time obtained by subtracting the current operating time of the monitored target 20 from the failure operating time can be calculated as the remaining life of the component of the monitored target 20.

The remaining life of the component of the monitored target 20 calculated by executing the remaining life estimation process described above is output from the condition monitoring device 10 to the information processing device 30. According to this, even when the condition of the component of the monitored target 20 is "normal", the administrator can grasp the remaining life of the component.

Here, the case where the remaining life of the component of the monitored target 20 is calculated is described, but the process of estimating the remaining life of the monitored target 20 itself may be executed after the process of step S43 shown in FIG. 16.

According to at least one embodiment described above, it is possible to provide a condition monitoring device and a method that are capable of determining the condition of a monitored target in real time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A condition monitoring device comprising:
a storage device configured to store in advance a template related to a time-series signal to be detected as a second operation segment signal; and
a processor connected to the storage device and configured to:
acquire a time-series signal related to a condition of a monitored target from a first sensor;
acquire operation timing information indicating a start of an operation of the monitored target;
detect a first operation segment signal from the time-series signal based on the operation timing information;
detect, as a second operation segment signal, a time-series signal in a segment identified based on a degree of similarity to the template of the first operation segment signal; and
determine a condition of the monitored target based on the second operation segment signal, wherein
the template is updated based on the detected second operation segment signal,
the storage device is configured to store a trained model generated by learning a second operation segment signal detected when the monitored target is in a normal condition,
the processor is configured to determine a condition of the monitored target based on an output signal output from the trained model by inputting, as an input signal, the detected second operation segment signal to the trained model,
the trained model is updated based on the detected second operation segment signal when it is determined that a condition of the monitored target is normal,
the processor is configured to calculate an anomaly score based on an output signal output from the trained model by inputting, as an input signal, the detected second operation segment signal to the trained model, and determines a condition of the monitored target based on the anomaly score, and the trained model is updated at timing that is determined based on a change in a distribution of the calculated anomaly score.

2. The condition monitoring device according to claim 1, wherein the template comprises an average waveform of a plurality of second operation segment signals detected within a predetermined period.

3. The condition monitoring device according to claim 2, wherein the template is updated regularly, and the second operation segment signals detected in the predetermined period comprises a second operation segment signal detected after the template was updated last time.

4. The condition monitoring device according to claim 1, wherein the template is updated at timing that is determined based on a difference between the template and the second operation segment signal detected based on a degree of similarity to the template.

5. The condition monitoring device according to claim 1, wherein the trained model is updated based on a plurality of second operation segment signals detected within a predetermined period.

6. The condition monitoring device according to claim 5, wherein the trained model is updated regularly, and the second operation segment signals detected within the predetermined period comprises a second operation segment signal detected after the trained model was updated last time.

7. The condition monitoring device according to claim 1, wherein the trained model comprises a first trained model updated at a first time interval and a second trained model updated at a second time interval, the processor is configured to:

determine a condition of the monitored target using the first trained model; and determine a condition of a component, of the monitored target, used in an operation of the monitored target using the second trained model, and the second time interval is longer than the first time interval.

8. A condition monitoring device comprising:

a storage device configured to store in advance a trained model generated by learning a second operation segment signal when the monitored target is in a normal condition; and a processor connected to the storage device and configured to:

acquire a time-series signal related to a condition of a monitored target from a first sensor;

acquire operation timing information indicating a start of an operation of the monitored target;

detect a first operation segment signal from the time-series signal based on the operation timing information;

detect a second operation segment signal from the first operation segment signal based on a characteristic of a waveform of the first operation segment signal; and determine a condition of the monitored target based on an output signal output from the trained model by inputting, as an input signal, a second operation segment signal detected by a second detection unit to the trained model, wherein the trained model is updated based on the detected second operation segment signal when it is determined that a condition of the monitored target is normal, the storage device is configured to store a trained model generated by learning a second operation segment signal detected when the monitored tame is in a normal condition, the processor is configured to determine a condition of the monitored target based on an output signal output from the trained model by inputting, as an input signal, the detected second operation segment signal to the trained model, the trained model is updated based on the detected second operation segment signal when it is determined that a condition of the monitored target is normal, the processor is configured to calculate an anomaly score based on an output signal output from the trained model by inputting, as an input signal, the detected second operation segment signal to the trained model, and determines a condition of the monitored target based on the anomaly score, and the trained model is updated at timing that is determined based on a change in a distribution of the calculated anomaly score.

9. A method executed by a condition monitoring device comprising a storage device configured to store in advance a template related to a time-series signal to be detected as a second operation segment signal, the method comprising:

acquiring a time-series signal related to a condition of a monitored target from a first sensor;

acquiring operation timing information indicating a start of an operation of the monitored target;

detecting a first operation segment signal from the time-series signal based on the operation timing information;

detecting, as a second operation segment signal, a time-series signal in a segment identified based on a degree of similarity to the template of the first operation segment signal; and determining a condition of the monitored target based on the second operation segment signal, wherein the template is updated based on the detected second operation segment signal, and further comprising:

storing a trained model generated by learning a second operation segment signal detected when the monitored target is in a normal condition;

determining a condition of the monitored target based on an output signal output from the trained model by inputting, as an input signal, the detected second operation segment signal to the trained model;

updating the trained model based on the detected second operation segment signal when it is determined that a condition of the monitored target is normal;

calculating an anomaly score based on an output signal output from the trained model by inputting, as an input signal, the detected second operation segment signal to the trained model, and determines a condition of the monitored target based on the anomaly score; and updating the trained model at timing that is determined based on a change in a distribution of the calculated anomaly score.

* * * * *